(12) United States Patent
Tasaki et al.

(10) Patent No.: US 10,351,713 B2
(45) Date of Patent: Jul. 16, 2019

(54) INK FOR WHITE REFLECTIVE FILM, POWDER COATING MATERIAL FOR WHITE REFLECTIVE FILM, PRODUCTION METHOD OF WHITE REFLECTIVE FILM, WHITE REFLECTIVE FILM, LIGHT SOURCE MOUNT, AND LIGHTING DEVICE SHADE

(71) Applicant: ASAHI RUBBER INC., Saitama-shi, Saitama (JP)

(72) Inventors: Masutsugu Tasaki, Saitama (JP); Naoto Igarashi, Saitama (JP)

(73) Assignee: ASAHI RUBBER INC., Saitama-shi (JP)

( * ) Notice: Subject to any disclaimer, the term of this patent is extended or adjusted under 35 U.S.C. 154(b) by 0 days.

(21) Appl. No.: 15/495,345

(22) Filed: Apr. 24, 2017

(65) Prior Publication Data

US 2017/0267867 A1    Sep. 21, 2017

Related U.S. Application Data

(62) Division of application No. 14/765,118, filed as application No. PCT/JP2014/001036 on Feb. 26, 2014, now Pat. No. 9,663,664.

(30) Foreign Application Priority Data

Feb. 27, 2013    (JP) ................................. 2013-037974

(51) Int. Cl.
*C08L 83/04* (2006.01)
*C09D 5/33* (2006.01)
(Continued)

(52) U.S. Cl.
CPC ............. *C09D 5/004* (2013.01); *B05D 3/007* (2013.01); *C08L 83/00* (2013.01); *C08L 83/04* (2013.01);
(Continued)

(58) Field of Classification Search
None
See application file for complete search history.

(56) References Cited

U.S. PATENT DOCUMENTS 3,644,566 A * 2/1972 Kincheloe et al. ....... C08F 8/00
524/296
3,912,670 A * 10/1975 Huemmer .......... C08G 59/1461
428/379

(Continued)

FOREIGN PATENT DOCUMENTS

CN    101673716 A    3/2010
JP    2000-219825 A    8/2000
(Continued)

OTHER PUBLICATIONS

Oct. 25, 2016 Office Action Issued in U.S. Appl. No. 14/765,118.
Jun. 13, 2014 International Search Report issued in International Application No. PCT/JP2014/001036.

*Primary Examiner* — Robert S Loewe
(74) *Attorney, Agent, or Firm* — Oliff PLC

(57) ABSTRACT

There is provided an ink for white reflective film formation including: a liquid binder resin component containing a crosslinkable silicone liquid resin and crosslinkable silicone resin particles; and titanium oxide particles, the ink containing 10 to 500 parts by mass of the titanium oxide particles relative to a solid content of a total of 100 parts by mass in the liquid binder resin component.

9 Claims, 7 Drawing Sheets

(51) Int. Cl.
*C09D 11/102* (2014.01)
*C09D 183/04* (2006.01)
*C09D 5/03* (2006.01)
*C09D 11/037* (2014.01)
*B05D 3/00* (2006.01)
*C09D 183/06* (2006.01)
*C08L 83/00* (2006.01)
*C09D 7/61* (2018.01)
*C09D 1/00* (2006.01)
*C09D 7/40* (2018.01)
*C08K 3/22* (2006.01)

(52) U.S. Cl.
CPC .............. *C09D 1/00* (2013.01); *C09D 5/03* (2013.01); *C09D 5/031* (2013.01); *C09D 5/035* (2013.01); *C09D 7/61* (2018.01); *C09D 7/66* (2018.01); *C09D 11/037* (2013.01); *C09D 11/102* (2013.01); *C09D 183/04* (2013.01); *C09D 183/06* (2013.01); *C08K 2003/2241* (2013.01)

(56) References Cited

U.S. PATENT DOCUMENTS

| | | | | |
|---|---|---|---|---|
| 4,107,148 A * | 8/1978 | Fujiyoshi | C09D 167/00 | 525/440.02 |
| 4,608,421 A * | 8/1986 | Lin | C08G 63/695 | 525/403 |
| 4,683,271 A * | 7/1987 | Lin | C08G 63/695 | 525/403 |
| 4,877,837 A * | 10/1989 | Reising | C08F 8/42 | 524/14 |
| 4,968,751 A * | 11/1990 | Miles | C08F 8/42 | 524/355 |
| 5,145,931 A | 9/1992 | Nakayoshi et al. | | |
| 5,227,435 A * | 7/1993 | Kang | C08G 63/6954 | 525/446 |
| 5,422,396 A * | 6/1995 | Daly | C08F 8/42 | 428/447 |
| 5,583,793 A | 12/1996 | Gray et al. | | |
| 5,756,568 A | 5/1998 | Morita et al. | | |
| 5,962,568 A * | 10/1999 | Decker | C08G 77/16 | 524/440 |
| 6,121,378 A * | 9/2000 | Miyawaki | C09D 133/068 | 525/100 |
| 6,376,603 B1 | 4/2002 | Kashiwagi | | |
| 6,399,081 B1 * | 6/2002 | Nakanishi | A61K 8/895 | 424/401 |
| 7,026,382 B2 | 4/2006 | Akiba et al. | | |
| 7,129,310 B2 * | 10/2006 | Greene | C08G 63/6954 | 528/26 |
| 9,507,054 B2 | 11/2016 | Dent et al. | | |
| 2004/0102561 A1 | 5/2004 | Nakano | | |
| 2005/0080204 A1 | 4/2005 | Furukawa et al. | | |
| 2006/0058440 A1 | 3/2006 | Morita et al. | | |
| 2006/0226774 A1 | 10/2006 | Sofue et al. | | |
| 2007/0099009 A1 | 5/2007 | Shimizu et al. | | |
| 2007/0126966 A1 | 6/2007 | Takahashi | | |
| 2007/0224431 A1 * | 9/2007 | Decker | C09D 5/033 | 428/447 |
| 2007/0269653 A1 | 11/2007 | Kanamori et al. | | |
| 2008/0138621 A1 | 6/2008 | Morita | | |
| 2009/0133905 A1 | 5/2009 | Kimura et al. | | |
| 2009/0171013 A1 | 7/2009 | Taguchi et al. | | |
| 2009/0211491 A1 | 8/2009 | Ogata et al. | | |
| 2009/0239997 A1 | 9/2009 | Taguchi et al. | | |
| 2010/0065880 A1 | 3/2010 | Kashiwagi et al. | | |
| 2010/0112074 A1 | 5/2010 | Inokuchi et al. | | |
| 2010/0213404 A1 | 8/2010 | Morita et al. | | |
| 2011/0054072 A1 | 3/2011 | Sawada et al. | | |
| 2011/0110994 A1 | 5/2011 | Inokuchi et al. | | |
| 2011/0147722 A1 | 6/2011 | Hawker et al. | | |
| 2011/0147955 A1 | 6/2011 | Kashiwagi | | |
| 2012/0121909 A1 | 5/2012 | Kobayashi et al. | | |
| 2012/0138997 A1 | 6/2012 | Tasaki et al. | | |
| 2012/0319153 A1 | 12/2012 | Matsuda et al. | | |
| 2013/0011617 A1 | 1/2013 | Tasaki et al. | | |
| 2013/0241088 A1 | 9/2013 | Onai | | |
| 2013/0266781 A1 | 10/2013 | Hoffmann et al. | | |
| 2014/0162005 A1 * | 6/2014 | Most | C08L 33/08 | 428/35.8 |

FOREIGN PATENT DOCUMENTS

| | | |
|---|---|---|
| JP | 2003-176440 A | 6/2003 |
| JP | 2004-027146 A | 1/2004 |
| WO | 2010/150880 A1 | 12/2010 |
| WO | 2011/118108 A1 | 9/2011 |
| WO | 2012010302 A1 | 1/2012 |

* cited by examiner

INK FOR WHITE REFLECTIVE FILM, POWDER COATING MATERIAL FOR WHITE REFLECTIVE FILM, PRODUCTION METHOD OF WHITE REFLECTIVE FILM, WHITE REFLECTIVE FILM, LIGHT SOURCE MOUNT, AND LIGHTING DEVICE SHADE This is a Division of application Ser. No. 14/765,118 filed Jul. 31, 2015, which in turn is a national stage of PCT/JP2014/001036, filed Feb. 26, 2014, which claims the benefit of JP 2013-037974, filed Feb. 27, 2013. The disclosure of the prior applications is hereby incorporated by reference herein in its entirety.

TECHNICAL FIELD

The present invention relates to a white reflective film for use as a reflector or the like to reflect light emitted from a light source to the side where the light is to be applied, such white reflective film formed around a light emitting portion of light sources such as an LED device and an LED element or formed on the surface of a light source mount; and also, for use as a reflector or the like to reflect sunlight for concentration into a solar photovoltaic device.

BACKGROUND ART

Conventionally, there has been known a white reflective film formed as a reflector to reflect light emitted from a light source to the side where the light is to be applied. For example, Patent Literature 1 mentioned below discloses a white reflective film formed from a titanium oxide-containing silicone composition comprising: silicone; and anataze-type or rutile-type titanium oxide particles dispersed in the silicone. Such white reflective film is disclosed as not showing signs of yellow discoloration or deterioration with time and as highly reflecting high-intensity light of a wide range of wavelengths over a long period of time.

For a titanium oxide-containing silicone resin composition for forming a white reflective film as described above, a liquid ink has been conventionally used.

The ink is applied to the surface of a base member and then thermally cured. As a method for applying the ink, methods such as screen printing, roll coating, spray coating, and knife coating can be given. Preferred among these, is coating formation by screen printing wherein the ink is applied via a mesh screen, in terms of excellent controllability of the coating thickness.

Incidentally, a powder coating material including silicone and titanium oxide has been conventionally known. Most powder coating materials including silicone are used to impart stain repellency to the surface of products. For example, Patent Literature 2 mentioned below discloses a fluorine-containing resin powder coating material composition containing: fluorine-containing resin powder coating material particles (a); and methyl silicone resin particles (b) including photocatalytic titanium dioxide, wherein: the particles (a) and the particles (b) are contained substantially independently of each other; and the content of the particles (b) is 1 to 25 parts by mass relative to 100 parts by mass of the particles (a). Patent Literature 2 also discloses that the coating formed from such composition has a self-cleaning ability by photocatalysis; and that since the coating maintains excellent weatherproof performance of the fluorine-containing resin, the surface of products can remain maintenance-free over a long period of time. The purpose of this fluorine-containing resin powder coating material composition is to form a coating that imparts stain repellency to the surface of products.

Patent Literature 3 discloses a powder coating material composition having excellent heat resistance and adhesion at a high temperature of 300° C. or more. Specifically, Patent Literature 3 discloses a powder coating material composition wherein: a binder component is a silicone resin used singly, or a mixture of a silicone resin and at least one resin selected from an epoxy resin, a phenolic resin, an acrylic resin, a polyester resin, and a fluorocarbon resin; at least one of mica and whisker is contained as a reinforcing pigment; and the content of the silicone resin in the binder component is 60 wt % or more. The purpose of this powder coating material composition is to form a heat-resistant coating.

PRIOR ART

Patent Literature

[Patent Literature 1] WO2010-150880 pamphlet
[Patent Literature 2] Japanese Laid-Open Patent Publication No. 2003-176440
[Patent Literature 3] Japanese Laid-Open Patent Publication No. 2004-27146

SUMMARY OF INVENTION

Technical Problem

When a white reflective film is formed, a high degree of pencil hardness is difficult to obtain. When the hardness of the surface of a white reflective film is of a low degree, there are problems such as dust attaching thereto and reflectance thereof gradually lowering due to fine scratches created thereon. Moreover, when a white reflective film is formed by applying ink, it may be difficult to form a coating with uniform thickness on the surface of products having a complex three-dimensional shape.

Solution to Problem

One aspect of the present invention is an ink for white reflective film containing a crosslinkable silicone liquid resin, crosslinkable silicone resin particles, and titanium oxide particles, the ink containing 10 to 500 parts by mass of the titanium oxide particles relative to a solid content of a total of 100 parts by mass in the crosslinkable silicone liquid resin and the crosslinkable silicone resin particles.

Another aspect of the present invention is a production method of white reflective film including: a step of forming a coating by screen printing or roll coating the foregoing ink for white reflective film onto a base member; and a step of thermally curing the coating.

Still another aspect of the present invention is a powder coating material for white reflective film containing: a crosslinkable silicone solid resin; and 10 to 500 parts by mass of titanium oxide particles relative to 100 parts by mass of the crosslinkable silicone solid resin.

Further aspects of the present invention are: a white reflective film having an initial reflectance for light at a wavelength of 550 nm that is 80% or more and a pencil scratch hardness that is 8 B or higher, and containing a cured silicone resin and 10 to 500 parts by mass of titanium oxide particles relative to 100 parts by mass of the cured silicone resin; a light source mount or a lighting device shade with the foregoing white reflective film formed thereon.

Advantageous Effects of Invention

According to the present invention, there is obtained a white reflective film having excellent hardness and reflectance, the reflectance not being likely to lower with time.

DESCRIPTION OF EMBODIMENTS

[Embodiment 1]

Figure 1A:
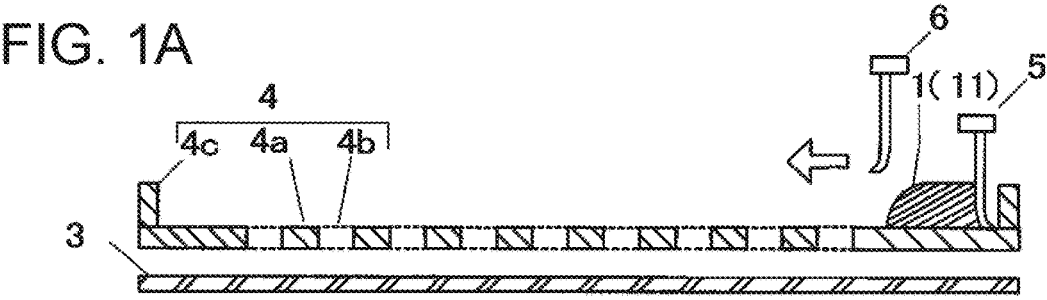
FIGS. 1A-1F are schematic sectional illustrations of a step-by-step depiction of a method for forming a white reflective film by screen printing.

The present inventors studied on the cause of the lowering in reflectance of a white reflective film which used silicone. As a result, they found that when the white reflective film had a low degree of hardness, dust attached to the surface or fine scratches were created on the surface, thereby causing reflectance to gradually lower with time. Thus, a white reflective film having a pencil scratch hardness of 8 B or higher was obtained by using silicone resin instead of silicone such as soft silicone rubber. Specifically, the white reflective film having a pencil scratch hardness of 8 B or higher was obtained by using a resin composition containing a crosslinkable silicone resin and titanium oxide particles, the content of the titanium oxide particles being 10 to 500 parts by mass relative to 100 parts by mass of the cross linkable silicone resin. According to such white reflective film, occurrences of problems as described above can be suppressed. In the following, a detailed description will be given of an ink for white reflective film for forming a white reflective film of the present embodiment (hereafter, also simply referred to as ink), a base member for applying the ink, a forming method, properties of the white reflective film, and others.

(Crosslinkable Silicone Resin)

The crosslinkable silicone resin is a resin component having, as a principal skeleton, a siloxane skeleton that forms a polymer with a three-dimensional network structure that is highly-branched and dense obtained by a thermosetting treatment. The term crosslinkable in the present embodiment means the non-crosslinked or non-cured state of the resin having a reactive functional group that cures by forming a chemical bond by a curing treatment, and may be otherwise termed as curable. Further specifically, the crosslinkable silicone resin is an early condensation polymer that contains: trifunctional siloxane units (T units) originating from monomer units represented by $RSiX_3$ (where: R is an alkyl group, e.g., a methyl group, or a phenyl group; and X is a hydroxyl group or a hydrolyzable functional group, e.g., an alkoxy group); and as necessary, bifunctional siloxane units (D units) originating from monomer units represented by $R_2SiX_2$ and/or tetrafunctional siloxane units (Q units) originating from monomer units represented by $RSiX_4$, that is contained by being combined with the T units, and that stops a dehydration-condensation reaction between silanol groups at an early stage of the reaction. Such crosslinkable silicone resin forms a cured product having a three-dimensional network structure including a siloxane skeleton as the principal skeleton, by undergoing a curing treatment whereby unreacted silanol groups in the resin are dehydrated and condensed. The silicone resin may be a silicone resin formed by addition polymerization, or may be a network-like polysiloxane such as silsesquioxane that is synthesized by conducting hydrolysis on alkyltrialkoxysilane or the like having three hydrolyzable groups, and then conducting condensation polymerization on the resultant.

The crosslinkable silicone resin may be an unmodified silicone resin (straight silicone resin) having only R groups with alkyl groups, phenyl groups, or a combination of alkyl groups and phenyl groups as side chains; or may be a polyester-modified, acrylic-modified, epoxy-modified, alkyd-modified, or silicone rubber-modified silicone resin that is modified by causing an organic resin having an alcoholic hydroxyl group or the like to react with a hydroxyl group at the molecular end, with an alkoxy group that is a part of a silanol group, or with the like.

The crosslinkable silicone resin is usually in liquid or solid form at room temperature; and can be obtained as commercially-available products from, for example, Momentive Performance Materials Japan LLC., Wacker Asahikasei Silicone Co., Ltd., and Shin-Etsu Chemical Co., Ltd.

In such crosslinkable silicone resins, a curing catalyst is included as necessary. The curing catalyst is not particularly limited if capable of facilitating a curing reaction that allows condensation of a condensable group such as a silanol group or an alkoxy group in the silicone resin. Specific examples include curing catalysts that are aluminum-based (e.g., DX-9740 available from Shin-Etsu Chemical Co., Ltd.), titanium-based (e.g., D-20 and D-25 available from Shin-Etsu Chemical Co., Ltd.), phosphorous-based (e.g., X-40-2309A available from Shin-Etsu Chemical Co., Ltd.), and zinc-based.

(Crosslinkable Silicone Liquid Resin)

The crosslinkable silicone liquid resin can be obtained as a commercially-available product from, for example, Shin-Etsu Chemical Co., Ltd. Specifically, examples of a varnish of an unmodified silicone resin include: KR-400 and KR-242A being varnishes of a dimethyl-based straight silicone resin having a methyl group; and KR-271, KR-282, KR-300, and KR-311 being varnishes of a methyl phenyl-based straight silicone resin having a methyl group and a phenyl group. Examples of a varnish of a modified silicone resin include: KR-5230 and KR-5235 being varnishes of a polyester-modified silicone resin; KR-1001N and ES-1023 being varnishes of an epoxy-modified silicone resin;

KR-9706 being a varnish of an acryl-modified silicone resin; and KR-5206 being a varnish of an alkyd-modified silicone resin.

The crosslinkable silicone liquid resin may be a crosslinkable silicone liquid resin varnish of a solventless type; or a crosslinkable silicone liquid resin that is dissolved, or, diluted with a solvent for viscosity adjustment. The solvent is not particularly limited. Specific examples include toluene, xylene, n-butylalcohol, isopropylalcohol, diacetonealcohol, propyleneglycol monomethyletheracetate, 3-methyl-3-methoxybutyacetate, and methylethylketone. These may be used singly or in a combination of two or more.

The solid content concentration of the crosslinkable silicone liquid resin, when including an organic solvent, is preferably 10 to 80 mass % and further preferably 20 to 70 mass %. When the solid content concentration is too low, the titanium oxide particles tend to precipitate or volatilization of the organic solvent after application tends to take too much time. When the solid content concentration is too high, application tends to become difficult due to increased viscosity. The solution viscosity of the crosslinkable silicone liquid resin is preferably about less than 10 Pa·sec and further preferably about 0.0001 to 1 Pa·sec.

Preferably used as the crosslinkable silicone liquid resin, is a crosslinkable silicone resin capable of having a pencil scratch hardness of preferably 9 B to 7 H, further preferably 3 B to 7 H, and particularly preferably F to 6 H, when in the form of a 50 µm-thick cured film. Such crosslinkable silicone resin is preferably a dimethyl straight silicone resin wherein the R group is a methyl group, a methyl phenyl-based straight silicone resin wherein the R group is a combination of a methyl group and a phenyl group, or the like, which contains siloxane units of D units and siloxane units of T units. Particularly preferable is a dimethyl-based straight silicone resin or a methyl phenyl-based straight silicone resin, wherein: the degree of functionality (number of moles of T units/number of moles of D units) derived from the ratio between the D units and the T units is preferably 2.6 to 2.9 and further preferably 2.6 to 2.8; and the proportion of the phenyl group in the R group is preferably 20 to 60 mol % and further preferably 30 to 50%. Also preferable is a modification of the above dimethyl-based straight silicone resin or methyl phenyl-based straight silicone resin such as a polyester-modified silicone resin, an acryl-modified silicone resin, or an epoxy-modified silicone resin.

(Crosslinkable Silicone Resin Particles)

The crosslinkable silicone resin particles are, for example, a pulverized substance of a crosslinkable silicone solid resin. Specific examples of the crosslinkable silicone solid resin include unmodified silicone resins such as: YR3370 (Momentive Performance Materials Japan LLC) being a dimethyl-based straight silicone resin having a methyl group; SILRES MK and SILRES 610 (available from Wacker Asahikasei Silicone Co., Ltd.); and SILRES 604 (available from Wacker Asahikasei Silicone Co., Ltd.) being a methyl phenyl-based straight silicone resin having a methyl group and a phenyl group. When dissolved, each of these crosslinkable silicone solid resins can be used as a crosslinkable silicone liquid resin.

The crosslinkable silicone resin particles are obtained, for example, by pulverizing the crosslinkable silicone solid resin with a pulverizer such as a jet mill or an atomizer; and then, as necessary, classifying the resultant with a cyclone classifier or the like. The crosslinkable silicone resin particles and the titanium oxide particles may form composite particles by being melted and kneaded at a temperature equal to or more than the melting point of the crosslinkable silicone resin particles to become a kneaded substance, which is then pulverized. The crosslinkable silicone resin particles have a melting point of preferably 45 to 200° C., further preferably 60 to 150° C., and particularly preferably 70 to 130° C.

The average particle size of the crosslinkable silicone resin particles or the composite particles is not particularly limited and is preferably about 0.5 to 100 µm, further preferably about 10 to 80 µm, and particularly preferably about 15 to 50 µm. When the average particle size of the crosslinkable silicone resin particles or the composite particles is too large, when the particles are included in the ink for improving leveling performance as described below, in screen printing for example, the crosslinkable silicone resin particles tend not to pass through the screen mesh and tend to remain in the residual ink from squeegeeing; and the amount of the particles in the coating tend to decrease. When the average particle size of the crosslinkable silicone resin particles or the composite particles is too small, when the particles are included in the ink for improving leveling performance as described below, melt flowability at the time of thermosetting tend to lower; and the effect of improving leveling performance tends not to be obtained sufficiently. The average particle size corresponds to the median value ($D_{50}$) obtained by measurement using a laser diffraction particle size analyzer.

(Titanium Oxide)

For a specific example of the titanium oxide particles, rutile-type titanium oxide particles are preferable. Rutile-type titanium oxide particles are low in photocatalytic activity, and therefore suppress lowering in reflectance due to deterioration of the white reflective film caused by photocatalytic activity. Rutile-type titanium oxide further increases reflectance for the long wavelength region of 500 nm or more; whereas anatase-type titanium oxide further increases reflectance for the short wavelength region of 420 nm or less. The titanium oxide particles are not particularly limited in shape and is preferably spherical in terms of the particles having further increased reflectance.

The titanium oxide particles may be surface treated to suppress photocatalytic activity. For an inorganic surface treatment agent, zinc oxide, silica, alumina, zirconia, or the like can be arbitrarily selected.

The titanium oxide particles are preferably treated with a titanium coupling agent, an aluminate coupling agent, or a silane coupling agent. Treatment using these coupling agents may be conducted on the titanium oxide that has been treated with the inorganic surface treatment agent. Treating the titanium oxide particles with a silane coupling agent is preferable in terms of improving dispersibility and also increasing the film strength of the white reflective film. Specific examples of a silane coupling agent include coupling agents having a reactive functional group such as a vinyl group, a phenyl group, an alkoxy group, a glycidyl group, a (meta)acryloyl group, or the like. Further specific examples include $CH_2$=$CHSi(OCH_3)_3$ (vinyltrimethoxysilane), $C_6H_5Si(OCH_3)_3$, $C_2H_3O$—$CH_2O(CH_2)_3Si(OCH_3)_3$, $C_2H_3O$—$CH_2O(CH_2)_3SiCH_3(OCH_3)_2$, $CH_2$=$CH$—$CO$—$O(CH_2)_3SiCH_3(OCH_3)_2$, $CH_2$=$CCH_3$—$CO$—$O(CH_2)_3SiCH_3(OCH_3)_2$, 2-(2,3-epoxypropyloxypropyl)-2, 4,6,8-tetramethyl-cyclotetrasiloxane, 2-(2,3-epoxypropyloxypropyl)-2, and 4,6,8-tetramethyl-6-(trimethoxysilyl ethyl) cyclotetrasiloxane.

The average particle size of the titanium oxide particles is not particularly limited and is preferably 0.4 µm or less and further preferably 0.1 to 0.3 µm in terms of reflection efficiency and application suitability. The maximum particle size is preferably 1 μm or less. A larger maximum particle size tends to reduce smoothness after application.

(Preparation of Ink)

The ink is prepared by arranging the crosslinkable silicone liquid resin, the titanium oxide particles, and, as necessary, other component(s), in a predetermined ratio; and then mixing the resultant with a roller mill such as a three-roller mill or a five-roller mill, a ball mill, or the like. As described later, for the purpose of improving leveling performance, the crosslinkable silicone solid resin particles may be arranged as the crosslinkable silicone resin.

The solution viscosity of the ink is not particularly limited, and is arbitrarily adjusted in accordance with factors such as the kind of coater, the application amount, and, in the case of screen printing, the mesh size. Specifically, the solution viscosity is, for example, preferably 10 to 800 Pa·sec and further preferably 20 to 600 Pa·sec, and also further preferably 100 to 300 Pa·sec. In the case of screen printing, when the viscosity is too high, the ink tends to remain on the screen mesh and transferability tends to lower. When the viscosity is too low, only the crosslinkable silicone liquid resin tends to flow during leveling and the titanium oxide particles tend to be unevenly distributed. Viscosity corresponds to a value obtained by a measurement by a "method using a single cylinder rotational viscometer" in compliance with JIS K7117, conducted at room temperature (25° C.)

The proportion of the titanium oxide particles in the ink is 10 to 500 parts by mass, preferably 20 to 400 parts by mass, and further preferably 30 to 300 parts by mass, relative to 100 parts by mass of the crosslinkable silicone resin (solid content). When the proportion of the titanium oxide particles is less than 10 parts by mass, it becomes difficult to obtain an initial reflectance of 80% or more for light at, for example, a wavelength in a wide range such as 420 to 900 nm. When the proportion of the titanium oxide particles exceeds 500 parts by mass, coating formability degrades such that, for example, the coating becomes fragile and cracks occur therein.

The hardness of the cured film of the crosslinkable silicone resin can also be adjusted by, for example, mixing two or more kinds of crosslinkable silicone resins having different degrees of hardness. The hardness can also be adjusted by adjusting the crosslink density by arranging to include, as necessary, a crosslinkable silicone oil, a monofunctional reactive diluent, or the like. The hardness can be also be reduced by mixing a resin component having a low degree of hardness such as silicone rubber. The proportions of the crosslinkable silicone oil and the silicone rubber are each preferably 0.5 to 10 parts by mass and further preferably 1 to 5 parts by mass relative to a solid content of 100 parts by mass in the crosslinkable silicone resin.

To the ink, substances other than the titanium oxide particles such as an inorganic white filler and an organic or inorganic fluorescent substance may be added to the extent of not inhibiting the effects of the present invention. Additives such as an adhesion modifier and a leveling modifier may also be added. Specific examples of an inorganic white filler include alumina, barium sulfate, magnesia, aluminum nitride, boron nitride, barium titanate, kaolin, silica, talc, powdered mica, powdered glass, powdered aluminum, powdered nickel, calcium carbonate, zinc oxide, aluminum hydroxide, and magnesium hydroxide. These may be used singly or in a combination of two or more. In terms of improving heat conductivity of the white reflective film, alumina and aluminum nitride are preferred. In terms of improving reflectance with decreased amount of the titanium oxide, which is expensive, and increased amount of a light reflective pigment, which is less expensive, while also suppressing lowering in reflectance, barium sulfate, calcium carbonate, and the like are preferred. In terms of improving fire retardancy, aluminum hydroxide and magnesium hydroxide are preferred. Specific examples of a fluorescent substance include a CASN-based fluorescent substance, a silicate-based fluorescent substance, a garnet fluorescent substance such as a sialon-based fluorescent substance, a silicate salt fluorescent substance, a nitride/oxynitride fluorescent substance, a sulfide fluorescent substance, and a YAG-based fluorescent substance. Particularly, when forming the white reflective film around a light source that emits light having a wavelength of 300 to 420 nm such as ultraviolet light, near-ultraviolet light, or blue light, a wavelength conversion function can also be imparted to the white reflective film by adding an organic or inorganic fluorescent substance or the like that is brought into an excited state by lighting at 300 to 420 nm. Since the ink of the present embodiment is a composition for forming a white reflective film that exhibits high light reflectance, black-colored or dark-colored elements are substantially not included.

In the ink, for the purpose of improving leveling performance, the crosslinkable silicone solid resin particles, composite particles of the crosslinkable silicone solid resin and the titanium oxide, or the like may be included as the crosslinkable silicone resin. By including the crosslinkable silicone solid resin particles or the composite particles in the ink, during thermosetting of the coating, the crosslinkable silicone solid resin melts and flows, and in association therewith, the titanium oxide particles move as well, thereby smoothing the coating surface.

(Base Member)

The white reflective film is preferably formed on, for example: the surface of a light source mount such as a circuit board for mounting a light source; the surface of a lighting device shade; the surface of a lighting device housing; and a reflective material that reflects sunlight to a light-receiving element (e.g., solar photovoltaic element) so that the sunlight is concentrated thereat, or the surface and surrounding area of a mount for such light-receiving element. The white reflective film is also used as a reflector of a light conducting path that improves light conductivity, by being formed at the interface between light conducting plates or between light conducting sheets. As such, the white reflective film is used as a reflector formed in various products that require high light reflectivity.

Specific examples of a light source include a light emitting diode (LED), an organic EL element, a common incandescent lamp, and a fluorescent lamp.

Specific examples of a light source mount include sheets, films, and molded bodies in planar or three-dimensional form that are configured to mount a light source. These may have a circuit for mounting the light source. When these form a stacked structure, the inner layer(s) may have a circuit thereon, or a vapor-deposited metal or a metal foil laminated thereon. When the white reflective film is formed to cover the circuit, the film becomes a resist film that protects the circuit.

Specific examples of a circuit board include: a rigid or flexible circuit board provided with a circuit for mounting a light source; a submount for mounting the light emitting element; and a three-dimensional circuit board.

The kind of the base member is not particularly limited. Examples include: plates and foils made of metals such as copper and aluminum; planar substrates, three-dimensional substrates, and shaped bodies of ceramics such as aluminum nitride and alumina; glass-reinforced epoxy substrates; and rigid substrates, flexible sheets, flexible films, three-dimensional substrates, and molded bodies made of materials such as polyethylene naphthalate (PEN), polyacrylate, polycarbonate (PC), polysulfone (PSF), polyethersulfone (PES), polyimide (PI), polyetherimide (PEI), polyether ether ketone (PEEK), amorphous polyacrylate (PAR), liquid crystal polymer (LCP), polyethylene terephthalate (PET), and bismaleimide triazine (BT), and also, stacked bodies and stacked circuit boards wherein a vapor-deposited metal or a metal foil is laminated on the base members. The base member may also be a substrate in plate or sheet form obtained, for example, by impregnating a sheet such as a glass cloth or a non-woven glass fabric with the ink of the present embodiment. The base member may also be a film for forming a coverlay film.

The surface of the base member may be surface treated as necessary, in order to increase adhesion strength of the white reflective film. Specific examples of surface treatment include chemical surface treatments and/or physical surface treatments such as corona discharge treatment, plasma treatment, ultraviolet light treatment, flame treatment, ITRO treatment, surface roughening treatment, priming treatment whereby a silane coupling agent is applied, blasting treatment, chemical etching, rubbing treatment, and/or cleaning treatment using an organic-based solvent; and/or combinations of chemical surface treatment and physical surface treatment.

(Formation of White Reflective Film)

The ink is applied to the surface of the base member, resulting in formation of a coating with a predetermined thickness; and then the coating is then cured, thereby to form a white reflective film. The method for applying the ink is not particularly limited and is selected in accordance with factors such as the coating thickness and the base member form. Specific examples include screen printing, roll coating, spray coating, comma coating, knife coating, dip coating, dispensing, spin coating, and brushing. Among these, screen printing and roll coating are preferred in terms of easy formation of a coating with a uniform thickness.

When the coating is formed by applying the ink, unevenness and unintended imprints may remain thereon depending on the application method used. Specifically, for example, screen mesh imprints from screen printing or roll patterns from roll coating may remain on the coating surface. In order to lessen such screen mesh imprints and roll patterns, the crosslinkable silicone resin particles that are solid, composite particles of the crosslinkable silicone solid resin and the titanium oxide, or the like are preferably included in the ink. By including the crosslinkable silicone resin particles that are solid or composite particles in the ink, during thermosetting of the coating, the crosslinkable silicone resin that are solid melts and flows, and in association therewith, the titanium oxide particles move as well, thereby smoothing the coating surface.

The coating is cured by cross-linking of the crosslinkable silicone resin. To cure the coating, a suitable method is selected from photocuring, room temperature curing, and the like, in accordance with the kind of the crosslinkable silicone resin. Among these, thermosetting is particularly preferred. Even when photocuring or room temperature curing is used, thermosetting is preferably used in a combination therewith.

In the case of thermosetting, the coating is preferably cured at a temperature of preferably 120 to 300° C., further preferably 150 to 250° C., and particularly preferably 180 to 200° C. In the case of photocuring, the coating is preferably cured by using an ultraviolet light emitting device which emits light having a wavelength of 330 to 450 nm, i.e., ultraviolet light, and light having a wavelength of 500 to 600 nm, i.e., visible light. In the case of room temperature curing, for example, there is a method wherein the coating is cured by being left at room temperature for several days. Curing conditions are not limited to those above and are arbitrarily selected in accordance with the properties of the crosslinkable silicone resin and the base member. However, curing is preferably conducted in a combination with thermosetting.

Silicone usually contains a very small amount of unreacted low-molecular-weight siloxane originating from the starting material of the silicone. For example, when the white reflective film is formed on a circuit board that is eventually heat treated in a solder reflow process or the like, the low-molecular-weight siloxane becomes volatilized by the heat treatment. Such low-molecular-weight siloxane attaches to an electronic circuit and an electronic element, and sometimes becomes the cause of poor adhesion of solder during the reflow process conducted thereafter as well as poor adhesion when connecting a gold wire to the element. In order to lessen such low-molecular-weight siloxane in the white reflective film, by using a hot-air circulating oven, the film is preferably thermoset at about 180 to 250° C., or heat treated for a predetermined time (e.g., about 0.5 to 2 hours) after such thermosetting; or a thin white reflective film with a thickness of, for example, preferably 100 µm or less and further preferably 50 µm or less that allows easy volatilization of the low-molecular-weight siloxane therein is preferably formed and then heat treated, by using a hot-air circulating oven. The content of the low-molecular-weight siloxane in the white reflective film can be quantified by using gas chromatography. In the case of soft silicone such as silicone rubber, since large amounts of low-molecular-weight siloxane tend to be generated, it is necessary to conduct treatment for lessening the low-molecular-weight siloxane by, for example, heating under vacuum or by curing and then heating for long hours at a high temperature. In the case of a crosslinkable silicone resin, the amount of low-molecular-weight siloxane generated is less, even without conducting such treatment. Particularly, since crosslinkable silicone resin particles include low-molecular-weight cyclic siloxane in very small amounts, generation of low-molecular-weight siloxane can be suppressed for the amount of the crosslinkable silicone resin particles that are used.

In order to form a white reflective film wherein the content of low-molecular-weight 4-mer to 20-mer siloxanes is 100 ppm or less, it is preferable to use the ink wherein the content of low-molecular-weight 4-mer to 20-mer siloxane is preferably 300 ppm or less and further preferably 200 µm or less.

When thermosetting or heat treatment is conducted at 180 to 250° C., the low-molecular-weight siloxane in the white reflective film can be removed considerably. When the white reflective film is thin, with a thickness of preferably 100 µm or less and further preferably 50 µm or less, the low-molecular-weight siloxane becomes more easily removable by heat treatment.

The content of the low-molecular-weight siloxane in the white reflective film can be quantified by using gas chromatography. In terms of practicality, the white reflective film using soft silicone such as silicone rubber contains a relatively large amount of the low-molecular-weight siloxane, and therefore needs to undergo treatment for lessening the low-molecular-weight siloxane by heating under vacuum or by curing and then heat treating for long hours (e.g., 4 hours or more) at a high temperature. In the white reflective film of the present embodiment that includes a cured product of the crosslinkable silicone resin, the content of the low-molecular-weight siloxane is small, even without conducting such treatment.

Particularly, when thermosetting is conducted at a temperature of 180° C. or more, the low-molecular-weight 4 mer to 20-mer siloxane sufficiently vaporizes; and a white reflective film wherein the proportion of such siloxane is, for example, preferably 100 ppm or less, further preferably 50 ppm or less, and particularly preferably 10 ppm or less can be obtained. The low-molecular-weight 4-mer to 20-mer siloxane may also be further lessened by conducting heat treatment in a decompression oven.

It is preferable that the content of the low-molecular-weight siloxane is small, not only in the hard white reflective film described above, but also in the white reflective film using conventional silicone resin or silicone rubber.

For application in an electronic circuit assembly and the like which require such white reflective film wherein the proportion of the low-molecular-weight 4-mer to 20-mer siloxane is small, the white reflective film may not necessarily need to have a pencil scratch hardness of 8 B or higher. For example, when a flexible substrate using a polyimide sheet is used, if the white reflective film is hard, the film would crack or peel off as its curvature is increased or as its use becomes more frequent; and therefore, the white reflective film having, for example, a low degree of pencil scratch hardness of lower than 8 B may be used for increased adhesion. When light emission associated with heat generation from an LED element needs to be considered for the white reflective film, or when the white reflective ink is to be applied to a substrate on the periphery of a high-powered LED or a solar photovoltaic element, the pencil scratch hardness may be lower than 8 B in order to allow stabilization by reducing stress produced by thermal expansion. In such case, the coating is preferably heated and cured to vaporize and lessen the low-molecular-weight 4-mer to 20-mer siloxane.

(White Reflective Film)

The white reflective film formed as above has an initial reflectance for light having a wavelength in a wide range of 420 to 900 nm including 550 nm, that is preferably 80% or more, further preferably 85% or more, particularly 90% or more and especially 91% or more, and most preferably 95% or more. The initial reflectance corresponds to the reflectance of the white reflective film immediately after curing; and absorbance at a wavelength in a wide range can be measured by using a spectrophotometer, e.g., UV-3150 available from Shimadzu Corporation. Even after heat treatment is conducted at 150° C. for 100 hours, the reflectance is maintained at preferably 80% or more, further preferably 85% or more, particularly preferably 90% or more and especially 91% or more, and most preferably 95% or more.

The pencil scratch hardness of the white reflective film is 8 B or higher, preferably 6 B to 10 H, further preferably 2 B to 8 H, and particularly preferably H to 7 H. The white reflective film with such hardness has high scratch resistance and low tackiness. Therefore, since scratches are not easily created on the surface and dust or the like does not easily attach to the surface, lowering in reflectance over time is suppressed and the initial reflectance is maintained.

When the pencil scratch hardness is too high, although scratch resistance is excellent, cracks tend to occur. In order to suppress occurrences of cracks, the pencil scratch hardness is preferably 7 H or lower. Specifically, when a rigid substrate that linearly expands such as an aluminum substrate or a glass-reinforced epoxy substrate is used as the base member, if the pencil hardness exceeds 7 H, microcracks would tend to occur. In the case of a base member formed of a material with a very small linear expansion coefficient, such as a ceramic substrate, even if the pencil scratch hardness exceeds 7 H, microcracks would not tend to occur. For the coating on a flexible base member such as a film, the pencil scratch hardness is preferably B to 8 B to prevent inhibition of flexibility.

The thickness of the white reflective film is preferably 10 to 500 μm, further preferably 20 to 300 μm, and particularly preferably 30 to 100 μm. When the film is too thick, cracks tend to occur after curing. When the film is provided on a flexible sheet or film, the film is made thin and to have a thickness of 5 to 70 μm and preferably 10 to 50 μm, to be able to conform to the flexibility. When the film is too thin, the titanium oxide needs to be contained in high concentrations, in order to obtain an initial reflectance of 80% or more for light having a wavelength in a wide range such as 420 nm to 900 nm which is a visible spectrum. In such case, the coating becomes fragile and cracks tend to occur therein.

The proportion of the titanium oxide particles in the white reflective film is preferably adjusted arbitrarily in accordance with the thickness of the white reflective film. In order to obtain an initial reflectance of 80% or more for light having a wavelength in a wide range such as 420 to 900 nm, the titanium oxide particles are preferably included in high concentrations when the film is thin; and when the film is thick, high reflectance is obtained even with the titanium oxide particles included in low concentrations. According to studies conducted by the present inventors, results were obtained as shown in Table 1 below, with respect to the relation among: the thickness of the white reflective film; the amount of the titanium oxide particles included relative to 100 parts by mass (solid content) of the crosslinkable silicone resin; and the reflectance of light at 550 nm.

TABLE 1

| Thickness (μm) | Included parts (parts by mass) | Reflectance at 550 nm (%) |
| --- | --- | --- |
| 10 | 50 | 64 |
|  | 100 | 82 |
|  | 150 | 88 |
|  | 250 | 93 |
| 20 | 50 | 73 |
|  | 100 | 88 |
|  | 150 | 91 |
|  | 250 | 95 |
| 30 | 50 | 81 |
|  | 100 | 92 |
|  | 150 | 94 |
|  | 200 | 96 |
|  | 300 | 96 |
| 50 | 50 | 88 |
|  | 100 | 95 |
|  | 150 | 96 |
| 100 | 50 | 93 |
|  | 100 | 97 |
|  | 150 | 98 |

According to the results in Table 1, for example, in order to obtain a reflectance of 90%, 250 parts by mass are preferably included when the thickness is 10 μm; about 150 parts by mass are preferably included when the thickness is 20 μm; about 100 parts by mass are preferably included when the thickness is 30 μm; an amount of about slightly more than 50 parts by mass is preferably included when the thickness is 50 µm; and about 50 parts by mass is preferably included when the thickness is 100 µm.

Regarding the tackiness of the surface of the white reflective film, for example, vapor-deposited aluminum powder with an average particle size of 25 µm is evenly sprayed on the entire surface of the white reflective film; an excess of the evaporated aluminum powder that has overlappingly accumulated or that has lightly attached is blown away by using, from a distance of 100 mm, an air gun with a nozzle diameter of 2 mm and an air emission of 160 L/min; and then, the film surface is swept with a non-woven fabric; and with respect to reflectance for light having a wavelength of 550 nm, the percent decrease between that before spraying and that after sweeping with a non-woven fabric is preferably 5% or less, further preferably 3% or less, and particularly preferably 1% or less. In the case of such low tackiness, due to excellent non-stickiness, there would be suppression of lowering in reflectance with time that is caused by attachment of dust during use.

The white reflective film of the present embodiment preferably maintains a high adhesion. Specifically, for example, in the case of conducting a cross-cut test in compliance with JIS K5400 wherein: a cross-cut pattern of vertical and horizontal cuts spaced 1 mm apart is created on the white reflective film by using a cutter blade, thereby to prepare a test piece; CELLOTAPE™ available from NICHIBAN Co., Ltd. is attached to the test piece; and then the tape is swiftly pulled and separated, among the 100 squares of the cross-cut pattern that are formed, the number of the squares without separation of the coating is preferably 60 or more, further preferably 80 or more, particularly preferably 90 or more, and further particularly preferably 95 or more, and it is most preferable if all of the squares are without separation of the coating. The combination of hardness and adhesion can be adjusted by the kind of R group and the combination of D units, T units, and Q units and their proportions in the silicone resin; the composition of the silicone resin; the adjustment of cross-linkage degree of the silicone resin by using silicone rubber, crosslinkable silicone oil, or the like; the content of the titanium oxide particles; and a coupling agent, a primer/adhesive component, or the like.

[Embodiment 2]

A description will be given of steps in a method for forming a white reflective film by screen printing, with reference to FIGS. 1A-1F. In FIGS. 1A-1F, Reference Nos. 1 and 11 denote an ink which is a silicone varnish containing titanium oxide particles, and Reference No. 3 denotes a base member. Reference No. 4 denotes a screen mesh used in screen printing. The screen mesh 4 comprises: a mesh portion 4a; an aperture 4b; and a frame 4c. Reference Nos. 5 and 6 denote a scraper and a squeegee, respectively. Reference Nos. 10 and 30 denote a coating. Reference Nos. 20 and 40 denote a white reflective film.

Formation of a white reflective film by screen printing is conducted in the following steps. First, as in FIG. 1A, a screen mesh 4 is arranged above a base member 3. Then, an ink 11 is placed on the screen mesh 4. Next, as in FIG. 1B, with use of a scraper 5, the ink 11 is spread in the direction of the arrow and thus forced into an aperture 4b. Then, as in FIG. 1C, a squeegee 6 is moved in the direction of the arrow while being pressed against the screen mesh 4 and the base member 3. Then, as in FIG. 1D, the ink 11 is transferred onto the base member 3. Then, the transferred ink 11 is left for a predetermined time for leveling, so that the gaps between the ink masses corresponding to the mesh pattern of the screen mesh are filled. As such, as in FIG. 1E, a coating 30 of the ink 11 is formed on the base member 3. Then, as in FIG. 1F, the coating 30 is cured to form a white reflective film 40.

Figure 6:
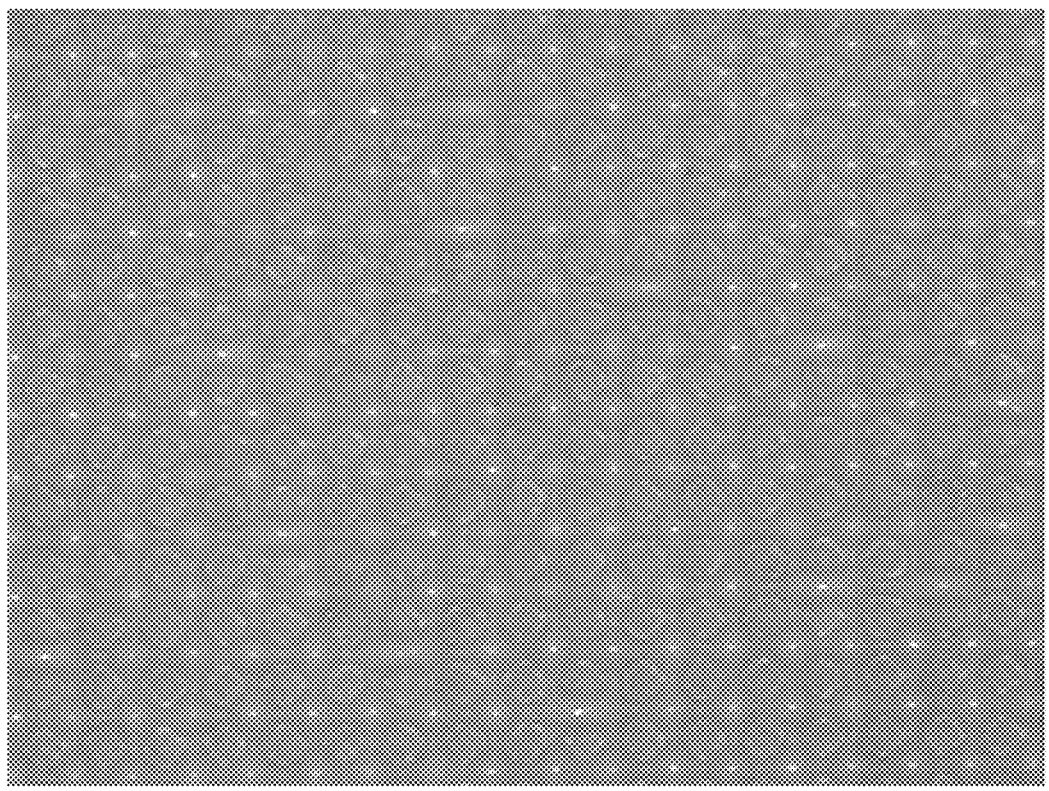
FIG. 6 is an image of when the surface of a white reflective film formed by screen printing in Example 17 was magnified about 147 times with a microscope for observation.
Figure 7:
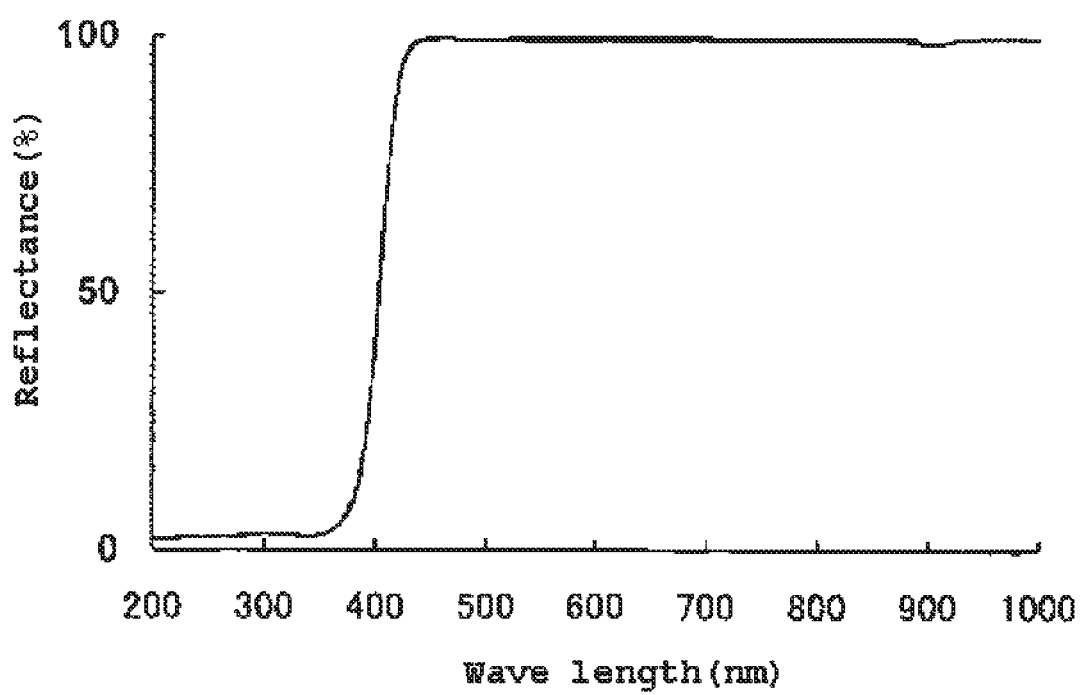
FIG. 7 shows the measurement results for the reflectance of a 50 μm-thick white reflective film obtained in Example 1.

When the present inventors attempted to form a white reflective film by a screen printing process using ink containing titanium oxide particles in high concentrations, they faced a problem of having difficulty in obtaining a white reflective film with a high degree of pencil hardness. As a result of extensive studies to solve this problem, they found out the following. That is, when the surface of the while reflective film formed by a screen printing process was magnified and observed, the surface was found to have an uneven mesh-like texture pattern (hereafter, also referred to as mesh marks) clearly remaining thereon. FIG. 6 shows an example of an image of the surface of the white reflective film obtained by a screen coating process, magnified about 147 times.

Figure 2:
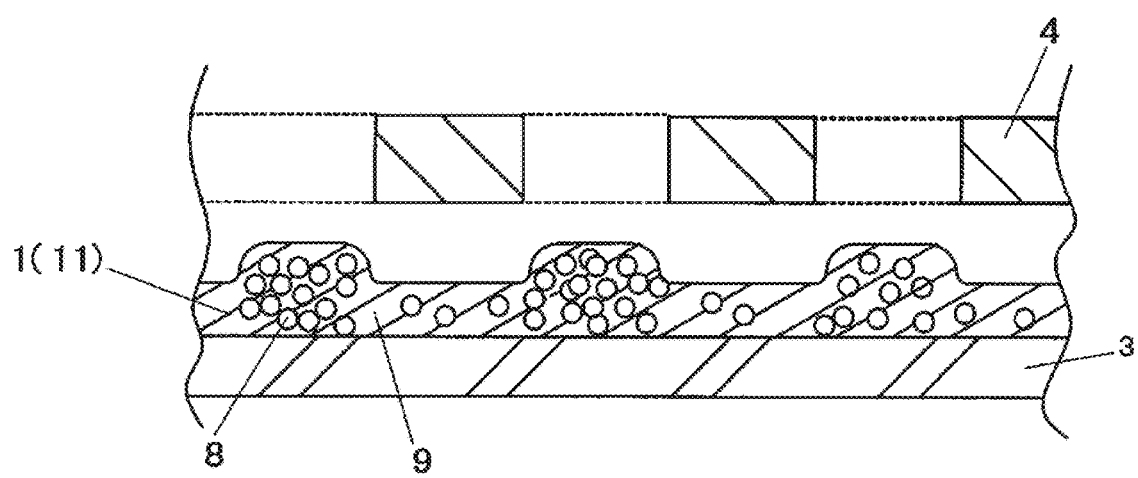
FIG. 2 is an explanatory illustration schematically depicting the leveling of a coating of an ink for white reflective film formed by screen printing.

For example, when only a crosslinkable silicone liquid resin not including titanium oxide particles were screen printed, leveling of the ink after separation of the screen mesh resulted in a smooth coating surface without any mesh marks. From the above, the cause of formation of mesh marks was studied; and this lead to the following observation. That is, a crosslinkable silicone liquid resin typically has a low solution viscosity (e.g., less than 10 Pa·sec). Therefore, the present inventors found out that when only such crosslinkable silicone liquid resin with a low solution viscosity was screen printed as a resin component, as in FIG. 2, during leveling of the ink after separation of the screen mesh 4, only the crosslinkable silicone liquid resin 9 flowed; whereas titanium oxide particles 8 with a high specific gravity that were nearly aggregated as if forming a stone wall, tended not to separate easily, and remained in that state. The present inventors presumed that this resulted in formation of the mesh marks described above. Moreover, they presumed that during leveling of the ink, only the crosslinkable silicone liquid resin 9 were thermally cured while the titanium oxide particles 8 remained motionless in a state of near aggregation, thereby causing mesh marks to remain. Still moreover, in a pencil hardness test, since the pencil got caught on such uneven mesh marks remaining on the white reflective film, the present inventors found out that the uneven mesh marks caused the white reflective film to separate and the degree of pencil hardness to lower. Based on such findings, the present inventors studied extensively on how to break down the aggregates of the titanium oxide particles that were the cause of forming uneven mesh marks.

In Embodiment 2, a description will be given of a method for forming a white reflective film with a high degree of pencil hardness by suppressing occurrences of uneven mesh marks being the cause of lowering the degree of pencil hardness, in the case where a white reflective film is formed by a screen printing process by using, as ink, a silicone varnish containing titanium oxide particles in high concentrations.

In the method for forming a white reflective film by a screen printing process of Embodiment 2, ink that is used contains a crosslinkable silicone liquid resin, crosslinkable silicone resin particles, and titanium oxide particles, the ink containing 10 to 500 parts by mass of the titanium oxide particles relative to a solid content of a total of 100 parts by mass in the crosslinkable silicone liquid resin and the crosslinkable silicone resin particles. By using such ink, during leveling or thermosetting of the coating, the titanium oxide particles that are unevenly distributed in regions with formation of mesh marks are made to flow. As a result, a white reflective film having a smooth surface whereon formation of mesh marks is suppressed, is obtained.

The method for forming a white reflective film of Embodiment 2 will be described with reference to FIGS. 1A-1F.

In the method of forming a white reflective film of Embodiment 2, first, an ink 1 is prepared. The ink 1 contains a crosslinkable silicone liquid resin, crosslinkable silicone resin particles, and titanium oxide particles, the ink containing 10 to 500 parts by mass of the titanium oxide particles relative to a solid content of a total of 100 parts by mass in the crosslinkable silicone liquid resin and the crosslinkable silicone resin particles.

Preferably 0.5 to 50 mass %, further preferably 1 to 30 mass %, and particularly preferably 3 to 15 mass % of the crosslinkable silicone resin particles are contained in the total solid content in the crosslinkable silicone liquid resin and the crosslinkable silicone resin particles. When the proportion of the crosslinkable silicone resin particles is too large, the solution viscosity of the ink becomes too high, and printability and applicability of the ink tend to lower. In contrast, when the proportion of the crosslinkable silicone resin particles is too small, the effect of including the crosslinkable silicone resin particles cannot be sufficiently obtained with ease, and leveling ability of the ink tends to lower. The average particle size of the crosslinkable silicone resin particles or the composite particles is not particularly limited and is preferably about 0.5 to 100 µm, further preferably about 10 to 80 µm, and particularly preferably about 15 to 50 µm. When the average particle size of the crosslinkable silicone resin particles or the composite particles is too large, for example, during screen printing, the particles tend not to pass through the screen mesh easily and thus remain in the residual ink from squeegeeing; and therefore, the amount of the particles in the coating tends to decrease. When the average particle size of the crosslinkable silicone resin particles or the composite particles is too small, melt flowability lowers at the time of thermosetting, and the effect of improving leveling ability of the ink tends to be insufficiently obtained.

The proportion of the titanium oxide particles in the ink is 10 to 500 parts by mass, preferably 20 to 400 parts by mass and further preferably 30 to 300 parts by mass relative to the solid content of 100 parts by mass in the crosslinkable silicone liquid resin and the crosslinkable silicone resin particles. When the proportion of the titanium oxide particles exceeds 500 parts by mass, the white reflective film becomes fragile. In contrast, when the proportion of the titanium oxide particles is less than 10 parts by mass, sufficient reflectance cannot be obtained unless the coating is made thick. However, when the coating is made too thick, the white reflective film becomes fragile. To the ink, as in Embodiment 1, substances other than the titanium oxide particles such as an inorganic white filler, an organic or inorganic fluorescent substance, an additive, and the like may be added.

Regarding the cured film of silicone obtained when the crosslinkable silicone resin is cured, when the cured film is formed to have a thickness of 50 µm, the pencil scratch hardness is 9 B or higher, preferably 3 B to 7 H, and further preferably F to 6 H. Such cured film preferably contains siloxane units of D units and siloxane units of T units, and is a dimethyl straight resin wherein the R group is a methyl group or a methyl phenyl-based straight resin wherein the R group is a combination of a methyl group and a phenyl group; and particularly, the degree of functionality (number of moles of T units/number of moles of D units) derived from the ratio between the D units and the T units is preferably 2.6 to 2.9 and further preferably 2.6 to 2.8; and the proportion of the phenyl group in the R group is preferably 20 to 60 mol % and further preferably 30 to 50%. As necessary, the crosslink density can be adjusted by including a crosslinkable silicone oil or a monofunctional reactive dilutent. The degree of hardness can also be lowered by mixing in a resin component with a low degree of hardness such as silicone rubber.

Considering that low-molecular-weight cyclic siloxane causes insulation failure on an electronic circuit, by using the crosslinkable silicone resin particles, low-molecular-weight cyclic siloxane can be lessened considerably; and this allows suppression of adverse effects to an electronic material caused by the low-molecular-weight cyclic siloxane that vaporizes from the white reflective film, such as non-conduction on a circuit. More specifically, in a silicone rubber ink obtained by polymerization with low-molecular-weight cyclic siloxane as the starting material, 20000 to 10000 ppm (2 to 1%) of the low-molecular-weight cyclic siloxane remains as an unreacted substance. Therefore, there is a high possibility of the low-molecular-weight cyclic siloxane vaporizing due to heat during shaping, thereby causing pollution inside the oven; or of the resultant film becoming an insulating film on an electronic circuit on a substrate; and there is a possibility of about 200 ppm of the low-molecular-weight cyclic siloxane remaining on the shaped product. In contrast, in the case of the crosslinkable silicone resin particles, since the material is reactive low-molecular-weight siloxane, most of the material polymerizes during curing, thereby forming a hard film; and with hardly any unreacted substance, the remaining low-molecular-weight cyclic siloxane is 10 ppm or less.

By using the ink containing such crosslinkable silicone liquid resin, crosslinkable silicone resin particles, and titanium oxide particles, the ink containing 10 to 500 parts by mass of the titanium oxide particles relative to a solid content of a total of 100 parts by mass in the crosslinkable silicone liquid resin and the crosslinkable silicone resin particles, a coating is formed on a base member by screen printing. Specifically, first, as in FIG. 1A, a moderate amount of the ink 1 is mounted on top of a screen mesh 4.

The form of the screen mesh is not particularly limited if capable of forming a coating with an intended thickness. A specific example is a screen mesh having a wire width of preferably about 20 to 70 µm and further preferably about 25 to 60 µm, a mesh size of preferably about 30 to 250 µm and further preferably about 60 to 180 µm, and a screen thickness of 30 to 200 µm and preferably 40 to 100 µm.

Figure 1B:
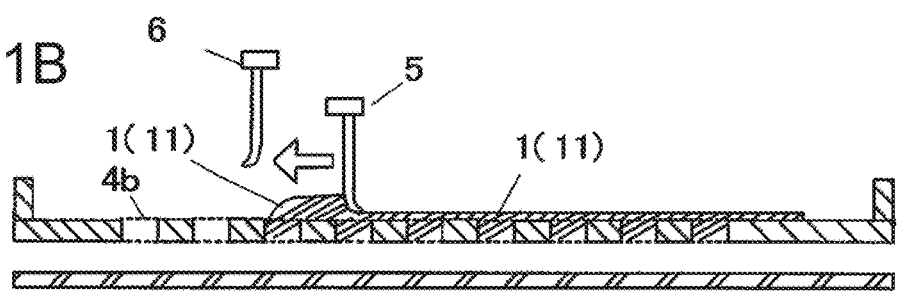
Figure 1C:
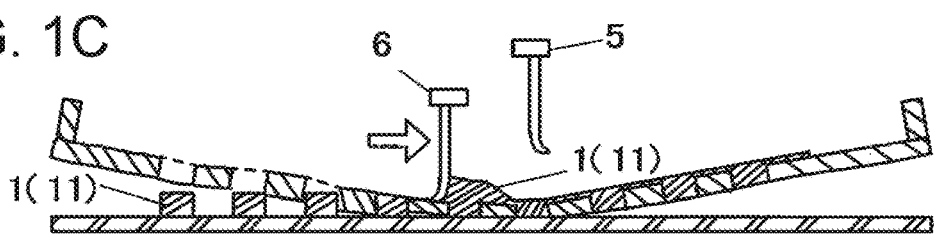
Figure 1D:
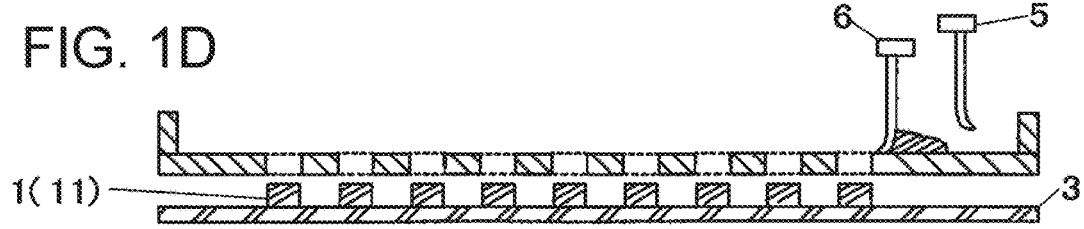

Subsequently, as in FIG. 1B, with use of a scraper 5, the ink 1 is spread in the direction of the arrow and thus forced into an aperture 4b. Then, all of the apertures 4b are filled with the ink 1. Then, as in FIG. 1C, a squeegee 6 is moved in the direction of the arrow while being pressed against the screen mesh 4 and the base member 3, thereby to transfer the ink 1 to the base member 3 as in FIG. 1D.

Figure 1E:
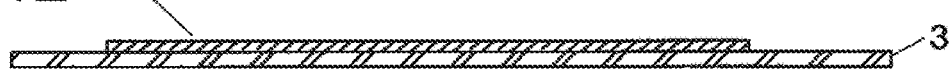

Subsequently, as in FIG. 1E, the applied ink 1 is left for a predetermined time, thereby to spread and level the ink 1. As such, a coating 10 comprising the ink 1 is formed on top of the base member 3.

The coating thickness of the coating formed by leveling is not particularly limited and is preferably 10 to 500 µm, further preferably 20 to 300 µm, and particularly preferably 30 to 200 µm at the time of curing. When the coating is too thick, the white reflective film formed tends to become fragile. When the coating is too thin, the titanium oxide needs to be contained in higher concentrations in order to obtain a sufficiently high reflectance; and in such case also, the white reflective film tends to become fragile.

Figure 1F:
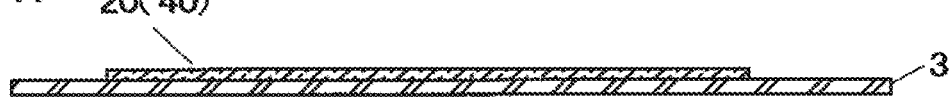

Subsequently, as in FIG. 1F, the coating 10 is thermally cured, thereby to form a white reflective film 20 on top of the base member 3. The conditions for thermosetting is similar to those for Embodiment 1. During the early stage of the thermosetting process, the viscosity of the crosslinkable silicone liquid resin lowers. At that time, the crosslinkable silicone resin particles maintain a relatively high melt viscosity, and therefore presumably moves while also breaking down the aggregates of the titanium oxide particles. Due to the melted crosslinkable silicone resin particles moving while also breaking down the aggregates of the titanium oxide particles, there is achieved a leveling whereby a highly smooth surface is formed.

[Embodiment 3]

In Embodiments 1 and 2, descriptions were given of methods for forming a white reflective film by using ink. According to such methods for forming a white reflective film by using ink, it may be difficult to apply the ink to a base member having portions that are three-dimensional or portions where there is a mix of regions with different heights, such that the resultant coating would have a uniform thickness. Specifically, when ink is used, formation of the coating may result in a smooth surface because outline of any subtle depressions and projections on the surface of base member would be covered. In such case, the shapes of regions with different heights may not be reflected on the surface of the white reflective film. The present inventors found that, by using a powder coating material for forming a white reflective film, even when the base member had a surface shape with different heights, the powder coating material was able to be applied in uniform thickness without the surface shape being covered. In the following, Embodiment 3 based on such finding will be given in detail.

A powder coating material is particularly effective in application to the inner surface of a housing for a lighting device, whereon an even coating is unlikely to be formed when a varnish-like ink is used; to the inner surface of cases of various devices; and onto a substrate with a three-dimensional form such as a three-dimensional substrate or a molded body.

In Embodiment 3, a description will be given of a method of forming a white reflective film by using a powder coating material for white reflective film containing: a crosslinkable silicone solid resin; and 10 to 500 parts by mass of titanium oxide particles relative to 100 parts by mass of the crosslinkable silicone solid resin. Specifically, for example, crosslinkable silicone resin flakes or powder and titanium oxide particles are kneaded together, and the resultant kneaded product is made into powder form to prepare composite particles. Then, a powder coating material containing such composite particles is sprayed and thus applied to a base member that is made electrostatic, followed by curing, thereby to form a white reflective film.

In the following, a detailed description will be given of the method of forming a white reflective film by using the powder coating material for white reflective film, according to Embodiment 3.

The powder coating material for white reflective film in Embodiment 3 contains the crosslinkable silicone solid resin, and contains 10 to 500 parts by mass of the titanium oxide particles relative to 100 parts by mass of the crosslinkable silicone resin. The powder coating material for white reflective film preferably comprises the composite particles including the crosslinkable silicone solid resin and the titanium oxide particles, because when in such form, handling is easy and quality after application is stable. The powder coating material may also be a mixture of such composite particles and crosslinkable silicone resin particles not including titanium oxide or may also be a mixture of such composite particles and titanium oxide particles. The powder coating material may also be powder of a mixture of the titanium oxide particles and crosslinkable silicone resin particles not including titanium oxide particles. The powder coating material may also include three kinds of particles, i.e., the composite particles, crosslinkable silicone resin particles not including titanium oxide, and titanium oxide particles.

As necessary, powder-coatable resin components other than the crosslinkable silicone resin may be included inside the composite particles and/or inside the crosslinkable silicone resin particles in the powder coating material, or may be included as an independent component. Such resin components not particularly limited if formed of a resin conventionally used as a binder in a powder coating material. Specific examples include a fluorocarbon resin, an acrylic-based resin, a polyester-based resin, an epoxy-based resin, and a phenolic-based resin, in particle form. In terms of excellent adhesion, an epoxy-based resin is particularly preferred; and in terms of excellent lustrousness, a polyester-based resin is particularly preferred. In terms of excellent chemical stability of factors such as heat resistance and discoloration resistance, a fluorocarbon resin is preferred.

The proportion of the crosslinkable silicone resin in the total amount of all of the resin components is 50 mass % or more, and is preferably 60 mass % or more, further preferably 80 mass % or more, and particularly preferably 90 mass % or more. When the proportion of the silicone resin in the total amount of all of the resin components is less than 50 mass %, light reflectance lowers with time. Particularly, when the powder coating material includes 50 mass % or more of a resin having an unsaturated bond such as a polyester-based resin or an epoxy-based resin, the resultant white reflective film tends undergo yellow discoloration with time.

The proportion of the titanium oxide particles in the powder coating material for white reflective film is 10 to 500 parts by mass, preferably 20 to 400 parts by mass, and further preferably 30 to 300 parts by mass. When the proportion of the titanium oxide particles is less than 10 parts by mass, it becomes difficult to obtain an initial reflectance of 80% or more for light having a wavelength in a wide range such as 420 to 900 nm. When the proportion of the titanium oxide particles exceeds 500 parts by mass, electrostatic coating becomes difficult; and also, coating formability degrades such that, for example, the coating becomes fragile and cracks occur therein.

To the powder coating material for white reflective film in the present embodiment, as in Embodiments 1 and 2, substances other than the titanium oxide particles such as an inorganic white filler, an organic or inorganic fluorescent substance, an organic or inorganic pigment, and an additive may be added.

A production method of the powder coating material for white reflective film in the present embodiment will be described. In production of the powder coating material for white reflective film, first, a crosslinkable silicone solid resin in flake or powder form, other resin component(s) to be included as necessary, titanium oxide, and other materials are arranged to have a composition as given above, and then preliminarily mixed using a Henschel mixer, a ball mill, or the like. Then, the material mixture obtained from preliminary mixing is melted and kneaded while being heated, using an extruder or heated rolls. Melting and kneading are preferably conducted at a temperature equal to or more than the melting point of the crosslinkable silicone solid resin, and less than the curing temperature. For example, when the melting point of the crosslinkable silicone solid resin is 110° C. and the curing temperature is 180° C., melting and kneading are conducted at 110° C. or more and less than 180° C.

The melted mixture obtained is finely pulverized using a pulverizer such as a jet mill or an atomizer. Then, coarse particles and fine particles are removed using a cyclone classifier or the like, to adjust particle size. As such, a powder coating material for white reflective film is obtained. As necessary, concentration may be minorly adjusted or physical property of the film may be adjusted, by adding crosslinkable silicone resin particles having a separately-adjusted particle size and not including titanium oxide, titanium oxide particles, or both. The powder coating material need not be such composite particles, and may be a mixture obtained by mixing the crosslinkable silicone resin particles and the titanium oxide particles, without conducting any kneading.

The composite particles of the powder coating material for white reflective film and the particles of the crosslinkable silicone resin are not particularly limited in particle size; and their average particles sizes are preferably about 0.5 to 100 µm, further preferably about 10 to 80 µm, and particularly preferably about 15 to 50 µm.

After the powder coating material for white reflective film obtained is applied to the surface of the base member, the powder layer is leveled by conducting heating and melting at a temperature equal to or more than the melting point of the crosslinkable silicone resin particles, e.g., 70° C. to 130° C. Thereafter, the resultant undergoes a baking treatment at 150° C. to 250° C. and is thus cured, thereby to form a white reflective film.

For the application method, any conventionally-known powder application method can be used without particular limitation. Specific examples include fluidized dip coating, thermal spraying, electrostatic fluidized dip coating, and electrostatic powder spraying. Before applying the powder on the base member, it is preferable to conduct, as necessary, a chemical surface treatment or a physical surface treatment such as corona discharge treatment, plasma treatment, ultraviolet light treatment, flame treatment, ITRO treatment, surface roughening treatment, priming treatment whereby a silane coupling agent is applied, blasting treatment, chemical etching, rubbing treatment, or cleaning treatment using an organic-based solvent; or a combination of a chemical surface treatment and a physical surface treatment.

Regarding the condition for baking treatment conducted after leveling of the applied powder layer by heating and melting, heat treatment is preferably conducted for about 60 to 20 minutes at a temperature used for heating and curing resin which is, for example, 100° C. to 350° C., preferably 130° C. to 300° C., and further preferably 150° C. to 250° C. The temperature for heating and curing is selected in view of factors of the base member such as glass transition temperature, melting point, thermal expansion coefficient, relative difference in thermal expansion coefficient between the base layer and the white reflective film, and heat resistance.

[Application]

The white reflective film according to each Embodiment is preferably used as a reflector to be formed on a light source mount such as a circuit board for mounting a light source such as LED, to be formed on the surface of a submount for mounting a light-emitting element such as an LED element, or to be incorporated into a solar cell assembly in order to reflect entering light for concentration into a photovoltaic element; or, as a reflector for more effectively conducting light from a light source to a light-conducting plate or sheet. Such white reflective film is not only used for electrical and electronic purposes, but can also be preferably used as a reflector for advertising displays, signboards, as well as products likely to be exposed to external heat or sunlight.

Figure 3:
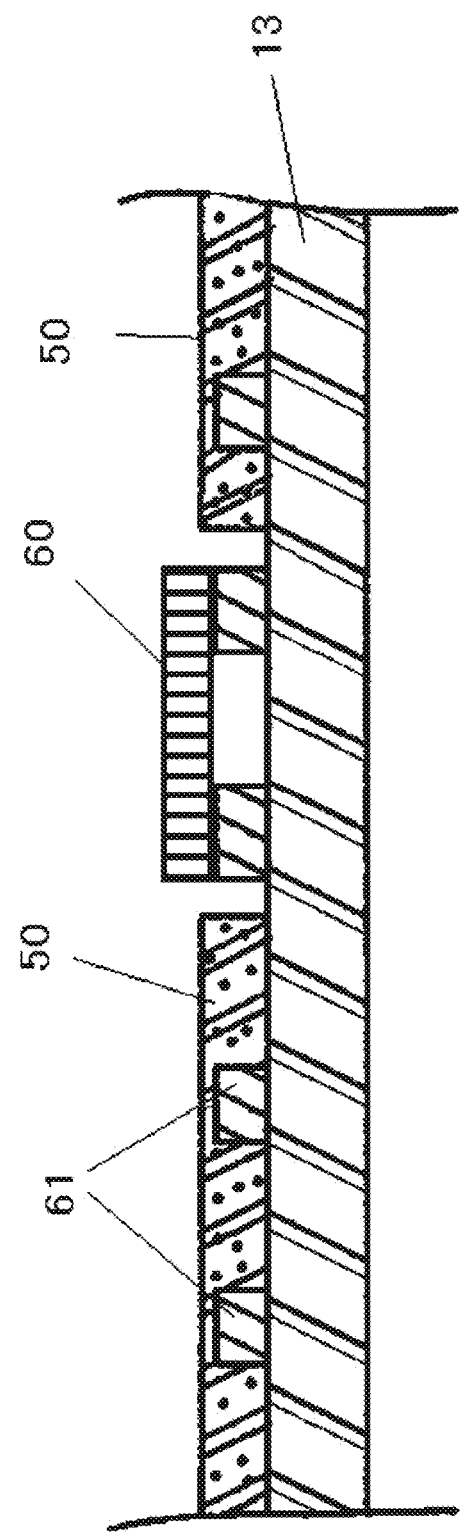
FIG. 3 is a schematic sectional illustration depicting the mounting of a light source onto a circuit board whereon a white reflective film is formed.
Figure 4:
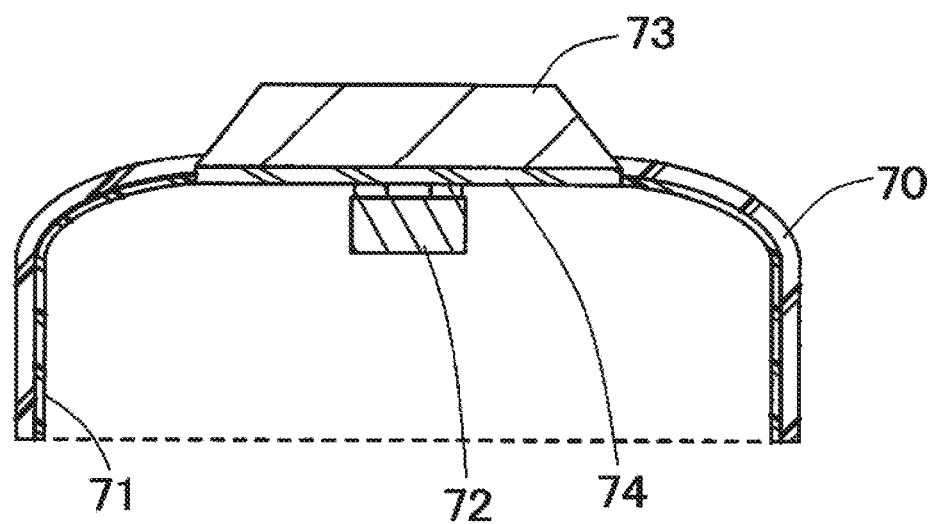
FIG. 4 is a schematic sectional illustration depicting a lighting device shade whereon a white reflective film is formed.

Specifically, for example, the white reflective film is used as a reflector with high reflectance, for example: by being formed as a white reflective film 50 on a circuit board 13 whereon a light source 60 such as an LED is mounted, such that circuits 61 surrounding the light source 60 are protected, as in FIG. 3; or by being formed on the surface of a submount for an LED element. Moreover, for example, as in FIG. 4, a white reflective film 71 formed on a lighting shade 70 serves as a reflector for reflecting light emitted from a light source 72 mounted on a mount substrate 74 provided with a heat-radiating plate 73, to a side where the light is to be applied.

EXAMPLES

Next, the present invention will be more specifically described by way of Examples. The following Examples, however, are not to be construed as limiting in any way the scope of the present invention.

First, evaluation methods used in the present Examples will be described on the whole, as follows.

(Pencil Scratch Hardness Test)

Evaluation for pencil scratch hardness was conducted in compliance with JIS K5600-5-4, using the white reflective film formed on the aluminum plate. That is, pencils having various degrees of hardness and sharpened to a predetermined state were each inclined at an angle of 45° and pointed onto the film surface, and then moved while being applied with a predetermined load. The hardness of the pencil with the greatest degree of hardness that did not create any scratch marks was regarded as the pencil scratch hardness. The above test was conducted five times, and evaluation was made based on their average.

(Measurement of Initial Reflectance and Reflectance after Accelerated Aging Treatment)

Reflectance of light having a wavelength of 220 to 1000 nm immediately after curing of the white reflective film formed on the aluminum plate, was measured using a UV-3150 spectrophotometer (available from Shimadzu Corporation).

Subsequently, the white reflective film formed on the aluminum plate underwent an accelerated aging treatment at 150° C. for 100 hours, and thereafter, the reflectance was measured again in a similar manner. Then, the percent decrease in reflectance for light having a wavelength of 550 nm, between that before and that after the accelerated aging treatment {(initial reflectance−reflectance after aging treatment)/initial reflectance×100}, was calculated.

(Dust Attachment)

To evaluate dust attachment, vapor-deposited aluminum powder (Nihon Koken Kogyo Co., Ltd./Alumiflake #40) with an average particle size of 25 µm was evenly sprayed onto the entire surface of the white reflective film formed on the aluminum plate; an excess of the vapor-deposited aluminum powder that had overlappingly accumulated or that had lightly attached was blown away by using, from a distance of 100 mm, an air gun with a nozzle diameter of 2 mm and an air emission of 160 L/min, and then swept with a non-woven fabric; and then the percent decrease in reflectance by the remaining vapor-deposited aluminum powder for light having a wavelength of 550 nm {(initial reflectance−reflectance after aluminum powder attachment)/initial reflectance×100}, was calculated.

(Adhesion)

Following a cross-cut test in compliance with JIS K5400, a cross-cut pattern of vertical and horizontal cuts spaced 1 mm apart was formed on the coating by using a cutter blade, thereby to prepare a test piece; CELLOTAPE™ available from NICHIBAN Co., Ltd. was attached to the test piece; and then the tape was swiftly pulled and separated. Among the 100 squares of the cross-cut pattern that were formed, the number of the squares without separation of the coating was counted; and 80 or more, less than 80 and 60 or more, and less than 60 were evaluated as A, B, and C, respectively.

(Content of Low-Molecular-Weight Siloxanes of 4-Mer to 20-Mer and 4-Mer to 10-Mer)

From about 1 g of the white reflective film taken as a sample, low-molecular-weight siloxanes were extracted in carbon tetrachloride. Then, by using gas chromatography, the amounts of the low-molecular-weight 4-mer to 10-mer and 4-mer to 10-mer siloxanes in the extract liquid were quantified. Gas chromatography was conducted under the conditions of using helium gas as carrier gas, using a stainless steel column of 3 m filled with silica, and increasing the temperature to 300° C. at a rate of temperature increase of 10° C./min.

(Presence and Non-Presence of Mesh Marks)

The surface of the white reflective film obtained was magnified about 147 times, and smoothness of the surface was visually evaluated on the following basis.

A: No mesh marks can be observed.
B: Mesh marks can be observed in small amounts or partially.
C: Mesh marks can be clearly observed on the entire surface.

Example 1

An ink for forming a white reflective film was prepared as follows. Relative to a solid content of 100 parts by mass in a dimethyl-based straight silicone resin varnish (dimethyl-based straight silicone resin varnish "KR-242A" available from Shin-Etsu Chemical Co., Ltd.; pencil scratch hardness when cured film (hereafter referred to as cured resin film) is formed to have a thickness of 50 μm: 5 H) with a solution viscosity of 0.012 Pa·sec, 200 parts by mass of rutile-type titanium oxide (SR-1 available from Sakai Chemical Industry Co., Ltd.; average particle size: 0.25 μm; surface treated with $Al_2O_3$) were added. Then, the arranged composition was kneaded by using a 3-roller mill to uniformly disperse the rutile-type titanium oxide, thereby to prepare a liquid ink with a solution viscosity of 10 Pa·sec.

The obtained ink was applied to an aluminum plate, a copper plate, a ceramic plate, and a glass-reinforced epoxy plate (glass-epoxy substrate) such that the thicknesses of coatings after curing became 50 μm. This was followed by heat treatment at 180° C. for 20 minutes to cure the coatings, thereby to obtain white reflective films. Then, evaluation was conducted based on the above-described evaluation methods. The results are shown in Table 2.

TABLE 2

| | | Ex. 1 | Ex. 2 | Ex. 3 | Ex. 4 | Ex. 5 | Ex. 6 | Ex. 7 | Ex. 8 | Ex. 9 | Ex. 10 | Comp. Ex. 1 |
|---|---|---|---|---|---|---|---|---|---|---|---|---|
| | Resin | Dimethyl-based straight silicone resin | Acryl-modified resin | Polyester-modified resin | Epoxy-modified resin | Methyl phenyl-based straight silicone resin | Methyl phenyl-based straight silicone resin | Methyl phenyl-based straight silicone resin | Methyl phenyl-based straight silicone resin + Reactive diluent | Dimethyl-based straight silicone resin | Dimethyl-based straight silicone resin | Silicone rubber |
| | Titanium oxide (parts by mass) | 200 | 200 | 200 | 200 | 200 | 200 | 200 | 200 | 200 | 200 | 200 |
| | Film thickness (μm) | 50 | 50 | 50 | 50 | 50 | 50 | 50 | 50 | 50 | 200 | 50 |
| | Pencil scratch hardness of white reflective film | 5H | 4H | 3H | H | F | 2B | 4B | 8B | 5H | 6H | — |
| Reflectance (%) | 420 nm | 89 | 86 | 87 | 81 | 87 | 89 | 80 | 84 | 87 | 95 | 87 |
| | 450 nm | 99 | 96 | 97 | 89 | 97 | 100 | 86 | 93 | 90 | 101 | 95 |
| | 550 nm | 95 | 92 | 93 | 90 | 92 | 96 | 93 | 91 | 92 | 97 | 94 |
| | 750 nm | 91 | 88 | 89 | 87 | 88 | 92 | 91 | 87 | 85 | 94 | 90 |
| | 900 nm | 86 | 83 | 84 | 82 | 82 | 88 | 87 | 83 | 80 | 90 | 85 |
| | 550 nm after heat treatment (150° C. × 100 hrs) | 94 | 92 | 93 | 84 | 92 | 91 | 88 | 90 | 91 | 96 | 94 |
| | Percent decrease after heat treatment (%) | 0.949 | 0.543 | −0.108 | 7.301 | 0.108 | 6.023 | 5.711 | 1.099 | 1.087 | 1.031 | 0.213 |
| | Dust attachment (%) | 1 or lower | 1 or lower | 1 or lower | 1 or lower | 1 or lower | 1 or lower | 1 or lower | 1 or lower | 1 or lower | 1 or lower | 8 |

TABLE 2-continued

| | | Example No. | | | | | | | | | | |
|---|---|---|---|---|---|---|---|---|---|---|---|---|
| | | Ex. 1 | Ex. 2 | Ex. 3 | Ex. 4 | Ex. 5 | Ex. 6 | Ex. 7 | Ex. 8 | Ex. 9 | Ex. 10 | Comp. Ex. 1 |
| Adherence | Aluminum plate | A | A | A | A | A | A | A | A | C | A | C |
| | Copper plate | A | B | A | B | A | A | A | A | C | A | C |
| | Ceramic plate | A | B | A | B | A | A | A | A | A | A | C |
| | Glass-reinforced epoxy plate | A | B | A | B | A | A | A | A | C | A | C |
| Amount of low-molecular-weight D4 to D10 siloxane (ppm) | D4 to D10 | 1.7 | 2.3 | 1 | 5 | 1 | 2 | 2 | 10 | 1 | 5 | 5 |
| | D4 to D20 | 3.2 | 14.8 | 4 | 783 | 13.5 | 51 | 15 | 50 | 6 | 10 | 150 |

Example 2

An ink was prepared as in Example 1, except that an acryl-modified silicone resin varnish (acryl-modified silicone resin varnish KR-9706 available from Shin-Etsu Chemical Co., Ltd,; pencil scratch hardness of cured resin film: 3 H) was used instead of the dimethyl-based straight silicone resin varnish. Then, coatings were formed as in Example 1, except that the above ink was used instead of the ink used in Example 1; and the coatings were cured by heat treatment at 180° C. for 20 minutes. As such, white reflective films with a pencil scratch hardness of 4 H were formed and evaluated as in Example 1. The results are shown in Table 2.

Example 3

An ink was prepared as in Example 1, except that an polyester-modified silicone resin varnish (polyester-modified silicone resin varnish KR-5235 available from Shin-Etsu Chemical Co., Ltd,; pencil scratch hardness of cured resin film: 3 H) was used instead of the dimethyl-based straight silicone resin varnish. Then, coatings were formed as in Example 1, except that the above ink was used instead of the ink used in Example 1; and the coatings were cured by heat treatment at 180° C. for 20 minutes. As such, white reflective films with a pencil scratch hardness of 3 H were formed and evaluated as in Example 1. The results are shown in Table 2.

Example 4

An ink was prepared as in Example 1, except that an epoxy-modified silicone resin varnish (epoxy-modified silicone resin varnish ES-1023 available from Shin-Etsu Chemical Co., Ltd,; pencil scratch hardness of cured resin film: H) was used instead of the dimethyl-based straight silicone resin varnish. Then, coatings were formed as in Example 1, except that the above ink was used instead of the ink used in Example 1; and the coatings were cured by heat treatment at 180° C. for 20 minutes. As such, white reflective films with a pencil scratch hardness of H were formed and evaluated as in Example 1. The results are shown in Table 2.

Example 5

An ink was prepared as in Example 1, except that a methyl phenyl-based straight silicone resin varnish (methyl phenyl-based straight silicone resin varnish KR-311 available from Shin-Etsu Chemical Co., Ltd,; pencil scratch hardness of cured resin film: F) was used instead of the dimethyl-based straight silicone resin varnish. Then, coatings were formed as in Example 1, except that the above ink was used instead of the ink used in Example 1; and the coatings were cured by heat treatment at 180° C. for 20 minutes. As such, white reflective films with a pencil scratch hardness of F were formed and evaluated as in Example 1. The results are shown in Table 2.

Example 6

An ink was prepared as in Example 1, except that a methyl phenyl-based straight silicone resin varnish (methyl phenyl-based straight silicone resin varnish KR-282 available from Shin-Etsu Chemical Co., Ltd,; pencil scratch hardness of cured resin film: 2 B) was used instead of the dimethyl-based straight silicone resin varnish. Then, coatings were formed as in Example 1, except that the above ink was used instead of the ink used in Example 1; and the coatings were cured by heat treatment at 180° C. for 20 minutes. As such, white reflective films with a pencil scratch hardness of 2 B were formed and evaluated as in Example 1. The results are shown in Table 2.

Example 7

An ink was prepared as in Example 1, except that an unmodified methyl phenyl-based straight silicone resin varnish (methyl phenyl-based straight silicone resin varnish KR-271 available from Shin-Etsu Chemical Co., Ltd,; pencil scratch hardness of cured resin film: 4 B) was used instead of the dimethyl-based straight silicone resin varnish. Then, coatings were formed as in Example 1, except that the above ink was used instead of the ink used in Example 1; and the coatings were cured by heat treatment at 180° C. for 20 minutes. As such, films with a pencil scratch hardness of 4 B were formed and evaluated as in Example 1. The results are shown in Table 2.

Example 8

An ink was prepared as in Example 1, except that a methyl phenyl-based straight silicone resin varnish (methyl phenyl-based straight silicone resin varnish KR-271 available from Shin-Etsu Chemical Co., Ltd,; pencil scratch hardness of cured resin film: 4 B) with a reactive diluent (ME91/ available from Momentive Performance Materials Japan LLC.) added thereto was used instead of the dimethyl-based straight silicone resin varnish. Then, coatings were formed as in Example 1, except that the above ink was used instead of the ink used in Example 1; and the coatings were cured by heat treatment at 180° C. for 20 minutes. As such, white reflective films H with a pencil scratch hardness of 8 B were formed and evaluated as in Example 1. The results are shown in Table 2.

Example 9

An ink was prepared as in Example 1, except that a methyl phenyl-based straight silicone resin varnish (methyl phenyl-based straight silicone resin varnish KR-400 available from Shin-Etsu Chemical Co., Ltd,; pencil scratch hardness of cured resin film: 8 H) was used instead of the dimethyl-based straight silicone resin varnish. Then, coatings were formed as in Example 1, except that the above ink was used instead of the ink used in Example 1; and the coatings were cured by heat treatment at 180° C. for 20 minutes. As such, white reflective films I with a pencil scratch hardness of 8 H were formed and evaluated as in Example 1. The results are shown in Table 2. Regarding evaluation for pencil scratch hardness, since cracks occurred in the white reflective film formed on the aluminum plate due to difference in thermal expansion, the white reflective film formed on the ceramic plate was used.

Example 10

White reflective films were formed as in Example 1, except that the film thickness was changed to 200 μm, and were then evaluated. The results are shown in Table 2.

Comparative Example 1

An ink was prepared as in Example 1, except that a 60 Shore A silicone rubber (LR3303/60 available from Wacker Asahikasei Silicone Co., Ltd.,) was used instead of the dimethyl-based straight silicone resin varnish. Then, coatings were formed as in Example 1, except that the above ink was used instead of the ink used in Example 1; and the coatings were cured by heat treatment at 150° C. for 20 minutes, thereby to form white reflective films J. The white reflective films J had low degrees of hardness, and therefore could not be measured for pencil scratch hardness; but had a Shore A hardness of 60°. These films were evaluated as in Example 1. The results are shown in Table 2.

Example 11

An ink for white reflective film was prepared as follows. A dimethyl-based straight silicone resin varnish (dimethyl-based straight silicone resin varnish KR-400 available from Shin-Etsu Chemical Co., Ltd.; silicone resin concentration: 100 mass %) with a solution viscosity of 0.0012 Pa·sec; and a granular dimethyl-based straight silicone resin (particles with an average particle size of 15 μm prepared by pulverizing and classifying YR3370 in solid form and having a melting point of 109° C., available from Momentive Performance Materials Japan LLC.), were prepared.

Subsequently, relative to a solid content of 100 parts by mass in the dimethyl-based straight silicone resin varnish, 6 parts by mass of the granular dimethyl-based straight silicone resin and 200 parts by mass of rutile-type titanium oxide (SR-1 available from Sakai Chemical Industry Co., Ltd.; average particle size: 0.25 μm; surface treated with $Al_2O_3$) were added. Then, the arranged composition was kneaded by using a 3-roll mill, thereby to prepare an ink with a solution viscosity of 60 Pa·sec. In the solid content of the crosslinkable silicone resin components, the proportion of the granular dimethyl-based straight silicone resin was 5.7 mass %.

Figure 5:
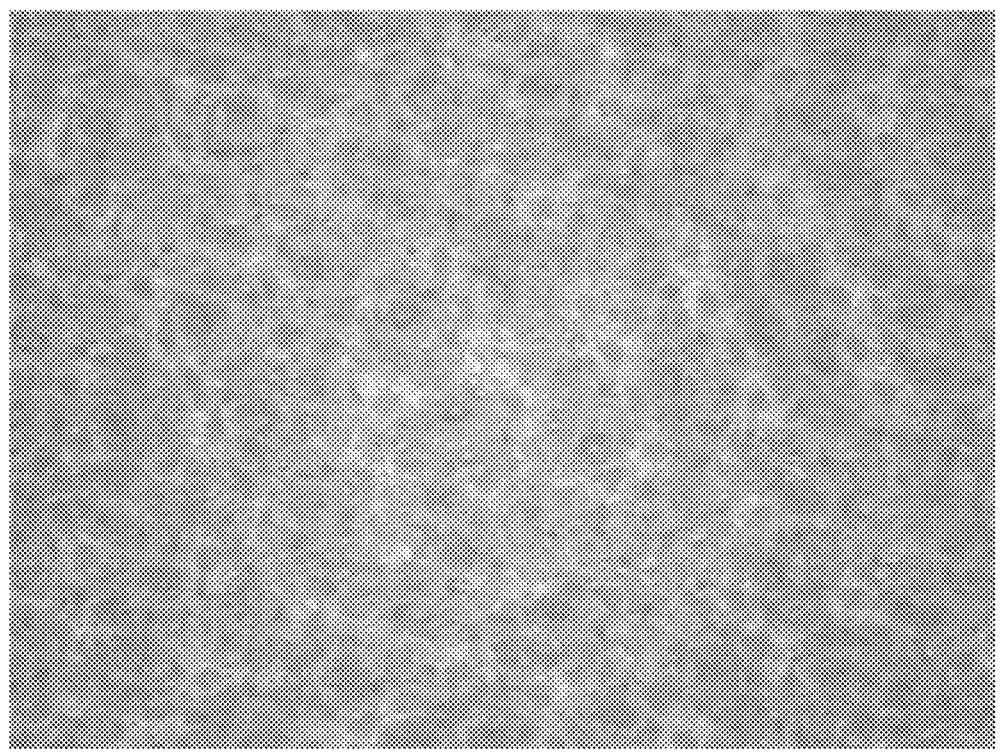
FIG. 5 is an image of when the surface of a white reflective film formed by screen printing in Example 11 was magnified about 147 times with a microscope for observation.

Subsequently, the obtained ink was used to form a coating on top of an aluminum plate by using a stainless screen mesh with a screen thickness of 90 μm, such that the thickness of the coating after curing became 50 μm. Then, the coating on the aluminum foil was heated at 130° C., leveled, and then thermally cured by heat treatment at 180° C. for 60 minutes, thereby to form a white reflective film with a thickness of 30 μm. Then, evaluation was conducted as above. The results are shown in Table 3. FIG. 5 shows an image of when the surface of the white reflective film obtained in Example 11 was magnified about 147 times with a microscope for observation.

TABLE 3

| | Example No. | | | | | | |
|---|---|---|---|---|---|---|---|
| | Ex. 11 | Ex. 12 | Ex. 13 | Ex. 14 | Ex. 15 | Ex. 16 | Ex. 17 |
| Proportion of granular silicone (mass %) | 5.7 | 2.0 | 0.5 | 9.0 | 16.6 | 5.7 | 0 |
| Mesh mark | A | A | B | A | A | A | C |
| Pencil scratch hardness | 6H | 6H | 5H | 6H | 7H | 6H | 5H |
| Reflectance (%, 550 nm) | 97 | 95 | 95 | 96 | 97 | 97 | 95 |

Example 12

An ink was prepared as in Example 11, except that, relative to a solid content of 100 parts by mass in the dimethyl-based straight silicone resin varnish, 2 parts by mass of the granular dimethyl-based straight silicone resin were arranged instead of 6 parts by mass of the granular dimethyl-based straight silicone resin; and a white reflective film was produced and evaluated as in Example 11. In the solid content of the crosslinkable silicone resin components, the proportion of the granular dimethyl-based straight silicone resin was 2.0 mass %. The results are shown in Table 3.

Example 13

An ink was prepared as in Example 11, except that, relative to a solid content of 100 parts by mass in the dimethyl-based straight silicone resin varnish, 0.5 part by mass of the granular dimethyl-based straight silicone resin was arranged instead of 6 parts by mass of the granular dimethyl-based straight silicone resin; and a white reflective film was produced and evaluated as in Example 11. In the solid content in the crosslinkable silicone resin components, the proportion of the granular dimethyl-based straight silicone resin was 0.5 mass %. The results are shown in Table 3.

Example 14

An ink was prepared as in Example 11, except that, relative to a solid content of 100 parts by mass in the dimethyl-based straight silicone resin varnish, 10 parts by mass of the granular dimethyl-based straight silicone resin were arranged instead of 6 parts by mass of the granular dimethyl-based straight silicone resin; and a white reflective film was produced and evaluated as in Example 11. In the solid content of the crosslinkable silicone resin components, the proportion of the granular dimethyl-based straight silicone resin was 9.0 mass %. The results are shown in Table 3.

Example 15

An ink was prepared as in Example 11, except that, relative to a solid content of 100 parts by mass in the dimethyl-based straight silicone resin varnish, 20 parts by mass of the granular dimethyl-based straight silicone resin were arranged instead of 6 parts by mass of the granular dimethyl-based straight silicone resin; and a white reflective film was produced and evaluated as in Example 11. Relative to the total solid content in the ink, the proportion of the rutile-type titanium oxide was 62.5 mass % and the proportion of the crosslinkable silicone resin components (solid content) was 37.5 mass %. In the solid content in the crosslinkable silicone resin components, the proportion of the granular dimethyl-based straight silicone resin was 16.6 mass %. The results are shown in Table 3.

Example 16

Composite particles comprising: a crosslinkable silicone resin; and titanium oxide particles kneaded in the crosslinkable silicone resin, were prepared as follows. Relative to 100 parts by mass of a dimethyl-based straight silicone resin as the crosslinkable silicone resin, 200 parts by mass of rutile-type titanium oxide were arranged. Then, the arranged composition was uniformly mixed by using a Henschel mixer. Then, the mixture was melted and kneaded while being heated at 80° C. by using a twin screw extruder, thereby to obtain a kneaded product. Then, the melted kneaded product was coarsely crushed at room temperature, followed by pulverization with a jet mill. The resultant was sieved and composite particles with an average particle size of 35 μm were prepared.

Instead of arranging the granular dimethyl-based straight silicone resin, the composite particles prepared above were arranged; and an ink was prepared such that the granular dimethyl-based straight silicone resin was 6 parts by mass and the rutile-type titanium oxide was be 200 parts by mass, relative to the solid content of 100 parts by mass in the dimethyl-based straight silicone resin varnish. Except that the above ink was used, a white reflective film was produced and evaluated as in Example 11. The results are shown in Table 3.

Example 17

Except that 6 parts by mass of the granular dimethyl-based straight silicone resin were not arranged relative to a solid content of 100 parts by mass in the dimethyl-based straight silicone resin varnish, an ink was prepared and a white reflective film was produced and evaluated as in Example 11. The results are shown in Table 3. FIG. 6 shows an image of when the surface of the white reflective film obtained by screen printing in Example 17 was magnified about 147 times with a microscope for observation.

Example 18

A powder coating material for white reflective film for forming a white reflective film was prepared as follows. Relative to 100 parts by mass of a dimethyl-based straight silicone solid resin in powder form, 200 parts by mass of rutile-type titanium oxide were arranged. For the dimethyl-based straight silicone solid resin, SILRES MK (pencil scratch hardness of 50 μm-thick cured film: HB, melting point: 50° C.) available from Wacker Asahikasei Silicone Co., Ltd. was used. Then, the arranged composition was uniformly mixed by using a Henschel mixer. Then, the mixture was melted and kneaded while being heated at 80° C. by using a twin screw extruder, thereby to obtain a kneaded product. Then, the melted kneaded product was coarsely crushed at room temperature, pulverized with a jet mill, and then sieved. As such, a powder coating material for white reflective film with an average particle size of 35 μm was prepared.

Subsequently, the obtained powder coating material for white reflective film was applied to an aluminum plate by using a corona-type electrostatic powder coater, such that the thickness of coating after curing became 50 μm; then the coating was cured by heat treatment at 180° C. for 30 minutes, thereby to obtain a white reflective film.

The results are shown in Table 4.

TABLE 4

| | Example No. | | | | | | |
| --- | --- | --- | --- | --- | --- | --- | --- |
| | Ex. 18 | Ex. 19 | Ex. 20 | Ex. 21 | Ex. 22 | Ex. 23 | Ex. 24 |
| Binder resin | Silicone resin 100% | Silicone resin 100% | Silicone resin 100% | Silicone resin 100% | Silicone resin 100% | Silicone resin 100% | Silicone resin/Silicone-modified polyester resin = 80%/20% |

TABLE 4-continued

| | | Ex. 18 | Ex. 19 | Ex. 20 | Ex. 21 | Ex. 22 | Ex. 23 | Ex. 24 |
|---|---|---|---|---|---|---|---|---|
| Titanium oxide (parts by mass) | | 200 | 200 | 200 | 200 | 200 | 100 | 200 |
| Film thickness (μm) | | 50 | 30 | 100 | 150 | 200 | 50 | 50 |
| Reflectance (%) | 420 nm | 90 | 84 | 90 | 90 | 91 | 88 | 89 |
| | 450 nm | 98 | 96 | 99 | 99 | 100 | 97 | 97 |
| | 550 nm | 95 | 91 | 98 | 98 | 98 | 94 | 95 |
| | 750 nm | 91 | 85 | 94 | 95 | 95 | 89 | 90 |
| | 900 nm | 85 | 79 | 89 | 90 | 91 | 83 | 86 |
| | 550 nm, after heat treatment (150° C. × 100 hrs) | 94 | 90 | 97 | 97 | 97 | 92 | 91 |
| | 440 nm, after heat treatment (150° C. × 1000 hrs) | 97 | 95 | 98 | 98 | 98 | 95 | 93 |
| | Percent decrease after heat treatment (%) | 1.053 | 1.100 | 1.020 | 1.020 | 1.020 | 2.128 | 4.211 |
| Pencil scratch hardness of white reflective film | | 5H | 4H | 5H | 6H | 6H | 5H | 5H |
| Adherence | | A | A | A | A | A | A | A |

Examples 19 to 22

Except that the powder coating material were applied such that the thicknesses of the coatings after curing became 30 μm, 100 μm, 150 μm, and 200 μm, respectively, instead of 50 μm, white reflective films were formed and evaluated as in Example 18.

Example 23

Except that application was conducted by using the powder coating material for white reflective film for which 100 parts by mass of the rutile-type titanium oxide, instead of 20 parts by mass thereof, were arranged relative to 100 parts by mass of the dimethyl-based straight silicone resin, a white reflective film was formed and evaluated as in Example 18.

Example 24

Except that application was conducted by using the powder coating material for white reflective film for which 80 mass % of the dimethyl-based straight silicone resin and 20 mass % of a silicone-modified polyester resin were arranged as a binder instead of arranging only the dimethyl-based straight silicone resin as a binder, a white reflective film was formed and evaluated as in Example 18.

The invention claimed is:

1. A powder coating material for a white reflective film comprising:
   a crosslinkable silicone solid resin comprising a crosslinkable straight silicone resin; and
   10 to 500 parts by mass of titanium oxide particles relative to 100 parts by mass of the crosslinkable silicone solid resin,
   wherein a proportion of the crosslinkable silicone solid resin in a total amount of all resin components contained in the powder coating material is 50 mass % or more.

2. The powder coating material for a white reflective film in accordance with claim 1 including 50 to 200 parts by mass of the titanium oxide particles relative to 100 parts by mass of the crosslinkable silicone solid resin.

3. The powder coating material for a white reflective film in accordance with claim 1, wherein the crosslinkable silicone solid resin has a melting point of 45 to 200° C.

4. A white reflective film having:
   an initial reflectance for light having a wavelength of 550 nm of 80% or more; and
   a pencil scratch hardness of 4B or higher,
   the white reflective film comprising:
   a cured silicone resin; and
   20 to 500 parts by mass of titanium oxide particles relative to 100 parts by mass of the cured silicone resin,
   wherein:
      the white reflective film is formed on a surface of a base member, and
      the content of low-molecular-weight 4-mer to 20-mer siloxane is 100ppm or less.

5. A white reflective film having:
   an initial reflectance for light having a wavelength of 550 nm of 80% or more; and
   a pencil scratch hardness of 4B or higher,
   the white reflective film comprising:
   a cured silicone resin; and
   20 to 500 parts by mass of titanium oxide particles relative to 100 parts by mass of the cured silicone resin,
   wherein:
      the white reflective film is formed on a surface of a base member;
      an initial reflectance for full-spectrum light over a wavelengths region of 425nm to 780 nm is 90% or more; and
      after undergoing heat treatment at 150° C. for 1000hours, a reflectance for light having a wavelength of 440 nm is 90% or more.

6. A light source mount having a white reflective film formed on a light source mounting surface,
   the white reflective film having:
      an initial reflectance for light having a wavelength of 550 nm of 80% or more; and
      a pencil scratch hardness of 4B or higher,
   the white reflective film comprising:
      a cured silicone resin; and
      20 to 500 parts by mass of titanium oxide particles relative to 100 parts by mass of the cured silicone resin.

7. A lighting device shade having a white reflective film formed on a surface on a light source side,
the white reflective film having:
an initial reflectance for light having a wavelength of 550 nm of 80% or more; and
a pencil scratch hardness of 4B or higher,
the white reflective film comprising:
a cured silicone resin; and
20 to 500 parts by mass of titanium oxide particles relative to 100 parts by mass of the cured silicone resin.

8. A white reflective film having:
an initial reflectance for light having a wavelength of 550 nm of 80% or more; and
a pencil scratch hardness of 4B or higher,
the white reflective film comprising:
a cured silicone resin of a crosslinkable silicone resin including a crosslinkable straight silicone resin; and
20 to 500 parts by mass of titanium oxide particles relative to 100 parts by mass of the cured silicone resin,
wherein the white reflective film is formed on a surface of a base member.

9. The white reflective film according to claim 8, wherein after undergoing heat treatment at 150° C. for 1000 hours, a reflectance for light having a wavelength of 440 nm is 90% or more.

* * * * *